United States Patent [19]

Müftü et al.

[11] Patent Number: 6,151,191
[45] Date of Patent: Nov. 21, 2000

[54] HELICAL SCAN RECORDING WITH A SELF-ACTING NEGATIVE AIR BEARING

[75] Inventors: Sinan Müftü, Chestnut Hill; Hans F Hinteregger, Newton, both of Mass.

[73] Assignee: Massachusetts Institute of Technology, Cambridge, Mass.

[21] Appl. No.: 09/347,978

[22] Filed: Jul. 6, 1999

Related U.S. Application Data

[62] Division of application No. 08/815,194, Mar. 11, 1997.

[51] Int. Cl.$^7$ ...................................................... G11B 5/53
[52] U.S. Cl. ............................................................ 360/107
[58] Field of Search .............................. 360/107, 130.23, 360/130.24

[56] References Cited

U.S. PATENT DOCUMENTS

| | | | |
|---|---|---|---|
| 3,737,582 | 6/1973 | DeMoss | 179/100.2 |
| 3,961,369 | 6/1976 | Baumann et al. | 360/84 |
| 4,725,910 | 2/1988 | Kaku et al. | 360/130.24 |
| 4,837,649 | 6/1989 | Tani et al. | 360/104 |
| 4,839,762 | 6/1989 | Yoneda et al. | 360/107 |
| 5,047,888 | 9/1991 | Mitsuhashi et al. | 360/130.34 |
| 5,175,660 | 12/1992 | Mitsuhashi et al. | 360/130.34 |
| 5,432,664 | 7/1995 | Watanabe et al. | 360/130.34 |
| 5,721,653 | 2/1998 | Lee | 360/107 |

OTHER PUBLICATIONS

Hans F. Hinteregger, Evaluation of a Row–Bar of Thin–Film Disk Heads (Merged Magnetoresistive/Inductive) as a Narrow–Track Head–Array for Ultra High Density Recording On Advanced Tape, Jul. 10, 1995, TMRC Poster Session.

Hans F. Hinteregger, Memorandum to Mk4/VLBA VLBI Development, Mar. 25, 1995, NSIC UHD Tape Program (Not admitted to be prior art).

C. Denis Mee and Eric D. Daniel (eds.), *Magnetic Recording*, Chapters 1 (all) and 7 (pp. 427–433, 482–493, and 496–503), vol. I: Technology, (1987).

C. Denis Mee and Eric D. Daniel (eds.), *Magnetic Recording*, Chapter 4 (pp. 180–183 and 192–193), vol. II: Computer Data Storage (1988).

James Eaton, letter to Dr. Hans Hinteregger, Dec. 19, 1994.

*Primary Examiner*—Robert S. Tupper
*Attorney, Agent, or Firm*—Steven J. Weissbsurg

[57] ABSTRACT

A flat head and a tape transport arrangement impart a wrap angle to the tape at the upstream corner of the head. The wrap angle, corner sharpness and tape stiffness are sufficient to cause a moving tape to form a hollow bump at the upstream corner, thereby creating a hollow into which entrained air can expand, causing a subambient pressure within and downstream of the bump. This pressure keeps the tape in contact with the head. It is created without the need for a groove or complex pressure relief slot(s). No contact pressure arises at the signal exchange site due to media wrap. The highest contact pressures are developed at a wrapped upstream corner. For a tape drive, traveling in both forward and reverse, the wrap can be at both the upstream and downstream (which is the "reverse upstream") corners. Heads that are not flat can also be used, if the wrap angle relative to a main surface is sufficient and not too large. The wrapped head can also be used with rotating media, such as disks (floppy and hard) and rotating heads, such as helical wound heads for video recording. Multiple flat tape bearing surfaces can be separated by grooves and/or angles. Each flat can carry heads along one or more gap lines. Multiple adjacent narrow tracks can thus be written for extreme high track density recording.

10 Claims, 17 Drawing Sheets

HELICAL SCAN RECORDING WITH A SELF-ACTING NEGATIVE AIR BEARING

This application is a divisional of application Ser. No. 08/815,194 filed Mar. 11, 1997 pending.

GOVERNMENT RIGHTS

This invention was made with government support under Contract Number NAS5-32353 awarded by NASA. The government has certain rights in the invention.

BACKGROUND

This invention relates generally to transport systems for sheetform media of magnetic and other types, and, more specifically, to an arrangement for enhancing contact at high speeds between a signal exchange head and a magnetic medium.

Increasing demands on data storage rates and capacities require modern tape drives to record in full contact between the head and the tape at relatively high speeds. In general, recording in contact minimizes losses due to the spacing between head and tape and enables higher recording densities (Hinteregger and Müftü). (This paper is incorporated fully by reference herein.) (A full citation to all references is at the end of this specification.) Contact is typically generated by wrapping a moving tape under tension over a curved geometry for the signal exchange surface. In such a situation, the contact pressure that arises is generally proportional to the ratio of the applied tension T to the radius of curvature R of the surface. Thus, increasing T and reducing R increases the contact pressure. Heads that are used for tape are typically made of a hard, ceramic material, and are designed to withstand the abrasive conditions of high speed tape use under such contact pressures.

Recording heads manufactured with the thin film (TF) semi-conductor technology are extensively used with magnetic hard disk media. These heads have signal processing properties that make them attractive for high speed, high signal density uses. However, at high contact pressures, thin film heads, just like ceramic heads made in conventional ways, experience head wear at the signal exchange site and recession at the magnetic poles, which can become a problem. Thin-film heads typically tolerate less than 1 $\mu$m wear and 30 nm of recession. Wear resistant head materials and tape bearing surface overcoats can improve the head's wear life. Wear rate tends to be inversely proportional to the hardness of the material (Bhushan and Lowry; Kawakubo and Yahisa) and proportional to contact pressure. But experiments show that wear is not proportional to contact pressure and is sublinear at sufficiently low Contact pressures (Bhushan Handbook). Therefore, the design of a contact-recording-head should include a hard load bearing surface, and guarantee contact pressures consistent with preventing separation of the tape from the head, and low enough to provide an acceptable head life (if not to arrest wear completely).

Some geometries, such as are shown schematically in FIGS. 1, 1A and 1B, promote what is known as "self-lubrication." As shown in FIG. 1B, the curvature of the signal exchange surface 12 is smoothly continuous, with no slope discontinuities. In other words, $$\frac{d^2\delta}{ds^2}$$

is continuous, where $\delta$ is the mathematical function describing the head and s is the coordinate axis along the head. The tape is typically wrapped around the head so that it follows the tangent to the surface at the point Z of separation. Such a wrapping is referred to herein as a "tangential wrap".

The tape and the unwrapped part of the surface form a gently converging channel, such that a relatively large volume of air is entrained therebetween. Air that is entrained at E between the tape 10 moving in the direction S and the signal exchange surface 12 of the head 14 forms a cushion that separates the two from each other over large extents of the head. When this occurs, it is said that the tape "flies". This is undesirable, as increases in the distance between the tape and the magnetic gap at the signal exchange site 16 cause exponential decreases in the strength of the read back signal. According to the Wallace equation, approximately 55 dB per wavelength A of the recorded signal is lost as a result of this distance increase. The separation shown in FIG. 1B is greatly exaggerated. An actual spacing of only 0.18 $\mu$m is enough to reduce the amplitude of a recording with a wave length of 1 $\mu$m by a factor of ten.

Although separation of the tape from the head due to the self-lubricating effects of entrained air ("flying") is, in general, undesirable, it is also undesirable to apply a large tension to the moving tape to dramatically overcome this air lubrication effect, because that may result in higher undesirable head wear rate, discussed above. Wear would be a particularly significant problem with relatively soft thin film layers. What is desired is to achieve a balance of the two effects: making sure that the tape would always be in contact with the head, with a minimal amount of contact pressure.

One known way to help to balance these effects is to introduce one or more grooves or relieved areas 18 into the head material, near to the upstream corner. As shown FIG. 1A, the entrained air is gradually compressed as it is drawn along between the tape 10 and the signal exchange surface 12 of the head 14, and expands into the cavity 18 shown at the arrow x. This expansion results in a reduction in pressure, sometimes even to a level below ambient, so that the net total pressure on the tape 10 downstream of the cavity 18, due to the surrounding air, is toward the head surface 12. The effect of this reduced pressure lessens as the distance downstream from the cavity 18 increases, and in some cases, additional grooves are used.

The use of such a groove provides the opportunity for more control over the balancing of the air and tension related contributions to the contact pressure between the tape and the head at different locations along the dimension of tape travel. However, radius lapping in particular, and to a lesser extent machining grooves, in the very hard materials used for modern heads, is difficult and costly.

In thin film heads, the signal exchange elements are made of layers that must have a certain minimum thickness to function. These layers must also be a certain minimum distance away from the main surface of the head, where the tape or other medium contacts it. Further, with curved surface heads, the surface must be machined (sometimes lapped) to a precise shape. However, as the surface is formed by removing surface material, it is difficult to achieve the required surface, while also maintaining the required thickness of the signal exchange elements, as they might be inadvertently removed during the shaping process. Further, if excessive material is removed during the shaping process, the remaining "buffer" might wear away too quickly during use, thereby exposing the signal element to excessive wear. Therefore, if thin film technology is to be used it is desirable to use a head surface that requires only minimal shaping.

The relative speed between the media and the head also has an impact on the contact conditions. In general, for a moving tape that is tangentially wrapped around a conventional head that has a smoothly curved surface, as described above, as the speed of the tape increases, the spacing between the tape and the head increases (Gross) This is due to the increased effect of the positive air bearing as tape speed increases. It is desirable for the spacing between the head and the tape to remain at an irreducible minimum, independent of effective speed. This is the definition of "contact recording". The general trend in industry is toward faster and faster tape speeds. Thus, it is a drawback if the tape/head spacing increases with increasing speed, within the desired speed range.

It is also common for linear tape drives to operate in both a forward and a reverse direction. Therefore, it is desirable that any arrangements to address the concerns discussed above work equally well in both the forward and reverse directions.

The problems of contact recording on flexible tape media are also present in rotating media (floppy disk) and rotating head (helical and transverse scan videotape recording) applications.

In the case of floppy disks and other rotating media, the disk rotates, passing by a head, which is stationary along the circumferential direction of media rotation, but which moves radially.

It is known to provide a disk head within a surrounding, adjoining structure that includes grooves, and other relieved formations, to counteract or counterbalance the self lubrication induced "flying" effect of entrained air. However, these structures require additional components. Further, these components must be made of hard material, so that they do not wear out quickly. Consequently, they must also be fabricated from hard material that is relatively difficult and costly to machine. Further, some of them are only useful in a single direction and would not be useful in the context of a bidirectional tape drive.

Accordingly, for the foregoing reasons, there is a need for a head and tape transport arrangement that can provide a direct contact between the various types of magnetic sheet media and the head, with minimal contact forces therebetween. There is also a need to prevent separation due to entrained air, without requiring a complex (radiused and grooved) head contour and/or structure adjoining the head.

Thus, it is an object of this invention to provide a head-tape interface that would keep the sheet media in contact with the head, without increasing the tendency of the head to wear. A further object is to achieve these goals with a simple head surface that does not require complicated radiused, relieved or grooved surfaces. Another object is to enable the use of heads having a substantially flat surface. Another object is to allow increased relative media to head speeds, without increasing spacing loss or decreasing head life. It is also an object to provide these advantages for a bidirectional tape, and also for rotating media, and also for rotating head.

SUMMARY

According to one aspect, the invention is a flat head combined with a tape transport arrangement that imparts a wrap angle to the tape at the forward direction upstream corner of the head. The wrap angle, corner sharpness and tape stiffness are sufficient to cause a moving tape to form a hollow bump at the upstream corner, thereby creating a hollow into which the entrained air can expand, causing a subambient pressure condition within and downstream of the bump. This subambient pressure keeps the tape in contact with the head, and it is created without the need for a groove or complex pressure relief slot(s). Because the head is flat, there is no contact pressure at the signal exchange site due to media wrap. (In most of the prior art, contact is provided by wrapping the tape over a curved surface at the signal exchange site.) The highest contact pressures are developed at a sharp, wrapped corner upstream of the subambient pressure bump, which is itself upstream of the signal exchange region where low pressure contact is maintained. In this low pressure contact region, the asperity contact pressure and the subambient air pressure are in equilibrium. For a bi-directional tape drive, traveling in both forward and reverse, the wrap can be provided at both the forward upstream and forward downstream (which is the "reverse upstream") corners. The invention is also useful with heads that are not flat, as long as the wrap angle with respect to the tangent at the upstream corner of the head surface is sufficient and not too large. The invention can also be used with rotating media, such as disks (floppy and hard) and rotating heads, such as helical wound heads for video recording. It is also an aspect of the invention to allow multiple flat tape bearing surfaces separated by grooves and/or angles between adjacent tape bearing flats. Each flat can carry heads along one or more gap lines. Multiple adjacent narrow tracks can be written with such an arrangement, thought to be useful for extreme high track density recording.

More specifically, a preferred embodiment of the invention is a support for a sheetform magnetic media having a characteristic stiffness and thickness, that travels forward along a machine dimension from a forward upstream direction to a forward downstream direction. The support comprises: a head, having a signal exchange surface. The signal exchange surface comprises: a signal exchange site; a forward upstream corner upstream of the signal exchange site; and an upstream main signal exchange surface curve, located along the machine dimension between the upstream corner and the signal exchange site, which signal exchange surface meets the upstream corner at a main slope discontinuity and has an upstream main tangent $\tau_{main}$ at the main slope discontinuity. The support also includes a forward upstream media guide, spaced upstream from the upstream corner. The upstream media guide is located relative to the upstream corner and the upstream corner is sufficiently sharp and the upstream main tangent is oriented such that, a sheetform media that is contacting the media guide and is moving forward under tension follows a certain path. The path has: a first portion of the media that contacts the upstream corner; a second portion of the media that is downstream and adjacent to the upstream corner contacting portion, which is spaced away from the signal exchange surface adjacent to and downstream from the main slope discontinuity, forming a hollow bump between the media and the signal exchange surface; and a third portion of the media downstream from and adjacent the hollow bump which contacts the signal exchange surface along the full extent from the bump to and including the signal exchange site.

The upstream corner comprises a corner surface that meets the main upstream signal exchange surface at the main slope discontinuity. The corner surface has a main corner tangent $\tau_{corner}$ at the main slope discontinuity and a side corner tangent $\tau_{side}$, at a side slope discontinuity that is spaced upstream from the main slope discontinuity.

The corner surface may be a substantially flat surface, whereby the main corner tangent $\tau_{corner}$ and the side corner tangent $\tau_{side}$ are substantially coincident, or a curved surface where they intersect.

In another preferred embodiment, the wrap angle θ from the upstream main tangent $\tau_{main}$ to the tape path immediately downstream of the media support is overwrapped past an angle α between the upstream main tangent $\tau_{main}$ and the side corner tangent $\tau_{side}$, with the wrap angle θ typically being greater than or equal to six times the angle α. The wrap angle can be between 0.25° and 5.5°, with ranges of particular interest between 0.25° and 0.5° (low contact pressure) and 1.5° and 5.5°.

Another preferred embodiment of the invention has a main surface that is substantially flat, while other preferred embodiments have a main surface that is curved, with a finite radius. Either the flat or curved embodiments of the invention can have a corner with a finite radius of curvature, which is either machined or developed through natural wear.

Embodiments of the invention that are particularly useful have thin film type signal exchange elements, such as read elements. Other beneficial embodiments employ ceramic magnetic signal exchange elements.

In yet another preferred embodiment, the invention is a media support as described above, further having a forward downstream corner, and a forward downstream signal exchange surface, defined by a downstream main signal exchange surface curve. The downstream elements may be essentially mirror images of the upstream elements mentioned above, or they may be arranged asymmetrically thereto. A downstream media guide is located relative to a downstream corner that is sufficiently sharp such that, a sheetform media that is contacting the downstream media guide and is moving under tension, in reverse, from the downstream direction to the upstream direction, follows a path as described above, but in reverse. A portion of the media contacts the downstream corner. A portion of the media that is upstream and adjacent to the downstream corner contacting portion, is spaced away from the downstream signal exchange surface adjacent to and upstream from the main downstream slope discontinuity, forming a downstream hollow bump between the media and the signal exchange surface. Another portion of the media, upstream from and adjacent the downstream hollow bump contacts the downstream signal exchange surface along the full extent from the downstream bump to and including the signal exchange site.

Yet another embodiment of the invention includes a media transport capable of moving the media in the forward and reverse directions, as well as signal amplification and processing circuitry. The transport may be capable of moving the media at speeds of between 2 and 40 m/s, particularly between 2 and 8 m/s.

The signal exchange surface may be free of any relieved regions.

With still another preferred embodiment, the media is a linear magnetic tape. In another, it is a rotating magnetic disk, and in another, the media is a helically wound magnetic tape. The media can also be a non-magnetic paper, with electromagnetic, or ink signals being applied thereto.

Yet another embodiment of the invention further includes a second head, substantially identical to the first head in configuration, except that the second head has a signal exchange site that is offset in a cross machine dimension, perpendicular to the machine dimension, from the signal exchange site of the first head. The second head is located forward downstream of the first head, and is oriented with respect to the first head, such that a sheetform media that is contacting the first head and is moving forward under tension follows a certain path. Along this path, a portion of any media contacts the upstream corner of the second head. Another portion of the media, which is downstream and adjacent to the upstream corner contacting portion for the second head, is spaced away from the signal exchange surface of the second head, adjacent to and downstream from the main slope discontinuity of the second head, forming a hollow bump between the media and the signal exchange surface of the second head. A third portion of the media downstream from and adjacent the hollow bump contacts the signal exchange surface of the second head along the full extent from the bump to and including the signal exchange site of the second head. There may also be a third head, arranged relative to the second head as the second is arranged relative to the first. These heads may also be flat or curved. Thus, more efficient width wise use of the tape may be made. In essence a relatively upstream head acts as the upstream media guide for a relatively downstream head. If the device is configured for two directional operation, then this same functional relationship exists for the reverse direction, but with the roles reversed: the forward downstream head acts as the media guide for the forward upstream head (in reverse operation).

Still another preferred embodiment is similar to the first described preferred embodiment, but, rather than being defined relative to the hollow bumped path that the media follows, it is identified by a forward upstream media guide, spaced upstream from the upstream corner. The upstream media guide is located and the upstream corner is shaped such that the media follows a path that is spaced a forward upstream wrap angle θ away from the upstream main tangent $\tau_{main}$, which wrap angle θ is between 0.25° and 5.5°, with particular interest between 0.25° and 0.5° (low contact pressure) and between 1.5° and 5.5°.

Another preferred embodiment of the invention is a support for a rotating sheetform magnetic media, having a signal face and an obverse face, which rotates along a circumferential machine dimension from an upstream direction to a downstream direction and passes by and exchanges signals with a media head. The support comprises a first head, having a signal exchange surface. The signal exchange surface is similar to that described above, and comprises a signal exchange site and an upstream corner upstream of the signal exchange site. An upstream signal exchange surface, defined by an upstream main signal exchange surface curve, is located along the machine dimension between the upstream corner and the signal exchange site. The signal exchange surface meets the upstream corner at a main slope discontinuity and has an upstream main tangent $\tau_{main}$ at the main slope discontinuity. A media rotational guide supports the media to rotate through a nominal reference plane P, which divides space into a signal region, toward which the signal face faces, and an obverse region, toward which the obverse face faces. A head support supports the head at a signal exchange position, with its signal exchange surface in the obverse region and spaced away from the reference plane, such that the signal exchange surface contacts the signal face of any media rotating through the reference plane and presses the signal face in a direction from the signal region toward the obverse region.

In such a rotary embodiment, it is also preferred that the signal exchange position be located and the upstream corner be sufficiently sharp and the upstream main tangent be oriented such that, when the head is positioned at the signal exchange position and any media is rotating, an upstream portion of the media contacts the upstream corner and a portion of the media that is downstream and adjacent to the upstream corner contacting portion, is spaced away from the signal exchange surface adjacent to and downstream from the main slope discontinuity, forming a hollow bump between the media and the signal exchange surface. A third portion of the media downstream from and adjacent the hollow bump contacts the signal exchange surface along the full extent from the bump to and including the signal exchange site.

The signal exchange surface may be a flat surface that is parallel to, or inclined at a non-zero angle $\phi$ relative to said register plane P. It may also be curved.

Another preferred, double sided version of the rotating embodiment, has a second head, substantially identical to the first head, spaced from the first head downstream along the machine dimension a distance d, supported by a second head support at a second signal exchange position, and oriented by a reflection of the orientation of the first head about the register plane P, with its signal exchange surface in the signal exchange region and spaced away from the reference plane, such that the signal exchange surface of the second head contacts the obverse face of any media rotating through the reference plane and presses the obverse face in a direction from the obverse region toward the signal region.

The invention also includes such a rotary embodiment, with a drive for rotating the media and signal amplification and processing circuitry.

In the rotating embodiments of the invention, the same considerations regarding the relation between the main signal exchange surface and the path of the media upstream of it apply. It is preferable to overwrap the media around the upstream corner, such that an angle is formed between the main tangent $\tau_{main}$ to a point along said media path upstream of said upstream corner and downstream of any portion of said disk that rotates in said register plane P, between 0.25 and 5.5° with lower angles tending toward lower contact pressure and higher angles tending toward more definite contact. The rotating embodiment is particularly useful in connection with stretched surface disks.

A preferred helical embodiment of the invention is a helical scan head assembly for use with magnetic tape that is wrapped helically around a rotating drum of the head assembly, and moves, relative to a stationary reference, in the same direction that the drum is rotating, but at a slower speed, so that, from the perspective of the rotating drum, the tape is observed to be moving along a circumferential machine dimension from an upstream direction to a downstream direction. The head assembly comprises a first circular cylindrical drum that is rotatable around an axis. Fixed to the rotatable drum is a head, having a signal exchange surface. The signal exchange surface comprises a signal exchange site and an upstream corner upstream of the signal exchange site. The signal exchange surface is further defined by an upstream main signal exchange surface curve, located along the machine dimension between the upstream corner and the signal exchange site, which signal exchange surface meets the upstream corner at a main slope discontinuity and has an upstream main tangent $\tau_{main}$ at the main slope discontinuity. The head is located at a radial position and the upstream corner is sufficiently sharp and the upstream main tangent is such that, if any tape is wrapped helically around the drum and contacts the head, and the drum is rotating relative to the tape, then the tape follows a path similar to that described above.

According to one preferred helical embodiment, the head is oriented and arranged relative to the circumference of the drum such that a wrap angle $\theta$ from an upstream main tangent $\tau_{main}$ to a point along the media path upstream of the upstream corner and downstream of any portion of the tape that contacts the circumference of said drum is between 0.25 and 5.5°.

According to another preferred helical embodiment, an upstream portion of the tape contacts the upstream corner. A portion of the tape that is downstream and adjacent to the upstream corner contacting portion, is spaced away from the signal exchange surface adjacent to and downstream from the main slope discontinuity, forming a hollow bump between the tape and the signal exchange surface. A third portion of the tape downstream from and adjacent the hollow bump contacts the signal exchange surface along the full extent from the bump to and including the signal exchange site.

In a preferred helical embodiment, the signal exchange surface may be flat and may be either parallel to or inclined at a non-zero angle $\phi$ relative to a tangent to the circumference of said drum along a radius that passes through the signal exchange surface.

A preferred embodiment of the method of the invention is a method for transporting a sheetform media having a characteristic stiffness and thickness, past a signal exchange head forward along a machine dimension from a forward upstream direction to a forward downstream direction, for the exchange of signals therebetween. The method comprises the steps of orienting and locating with respect to each other a head and a forward upstream media guide, spaced upstream from the head. The head has a signal exchange surface that comprises: a forward upstream corner upstream of the signal exchange site; and a forward upstream signal exchange surface. The latter is defined by an upstream main signal exchange surface curve, located along the machine dimension between the upstream corner and the signal exchange site, which signal exchange surface meets the upstream corner at a main slope discontinuity and has an upstream main tangent $\tau_{main}$ at the main slope discontinuity. The forward upstream media guide is spaced upstream from the upstream corner. The step of orienting and locating comprises the steps of locating the upstream media guide relative to the upstream corner and orienting the upstream main tangent of the head relative to the upstream media guide. The method further comprises the steps of routing the media past the upstream media guide and the head such that the media contacts both, and transporting the media forward under tension at such a speed, such that the media follows a path similar to that described above. A portion of the media contacts the upstream corner of the head. Another portion of the media, which is downstream and adjacent to the upstream corner contacting portion, is spaced away from the signal exchange surface adjacent to and downstream from the main slope discontinuity, forming a hollow bump between the media and the signal exchange surface. A third portion of the media downstream from and adjacent the hollow bump contacts the signal exchange surface along the full extent from the bump to and including the signal exchange site.

A final, helical wrap embodiment of the method of the invention is a method for transporting a magnetic tape having a characteristic stiffness and thickness, forward along a machine dimension from a forward upstream direction to a forward downstream direction, past a signal exchange head, for the exchange of signals therebetween. The method comprises the steps of orienting and locating with respect to each other a first circular cylindrical drum that is rotatable around an axis, and, fixed to the rotatable drum, a head. The head has a signal exchange surface that comprises a signal exchange site and an upstream corner upstream of the signal exchange site. Also included in the head is an upstream signal exchange surface, defined by an upstream main signal exchange surface curve, located along the machine dimension between the upstream corner and the signal exchange site, which signal exchange surface meets the upstream corner at a main slope discontinuity and has an upstream main tangent $\tau_{main}$ at the main slope discontinuity. The steps of orienting and locating comprise the steps of locating the head at a radial position of the drum; and orienting the main tangent of the head relative to the circumference of the drum. The overall method further includes the steps of wrapping the tape helically around the drum, such that the tape contacts both, and rotating the drum and thereby the head, in a rotation direction. The tape is transported under tension such that, at a point where the tape contacts the drum, a component of each of the velocities of the tape and the drum are parallel, but the tape moves at a slower speed, so that from the perspective of the drum, the tape is observed to be moving along a circumferential machine dimension from an upstream direction to a downstream direction. An upstream portion of the tape is contacted to the upstream corner and a portion of the tape that is downstream and adjacent to the upstream corner contacting portion, is spaced away from the signal exchange surface adjacent to and downstream from the main slope discontinuity, forming a hollow bump between the tape and the signal exchange surface. A third portion of the tape downstream from and adjacent the hollow bump contacts the signal exchange surface along the full extent from the bump to and including the signal exchange site.

BRIEF DESCRIPTION OF THE DRAWINGS

These and other features, aspects, and advantages of the present invention will become better understood with regard to the following description, appended claims and accompanying drawings, where:

DETAILED DESCRIPTION

Figure 1A:
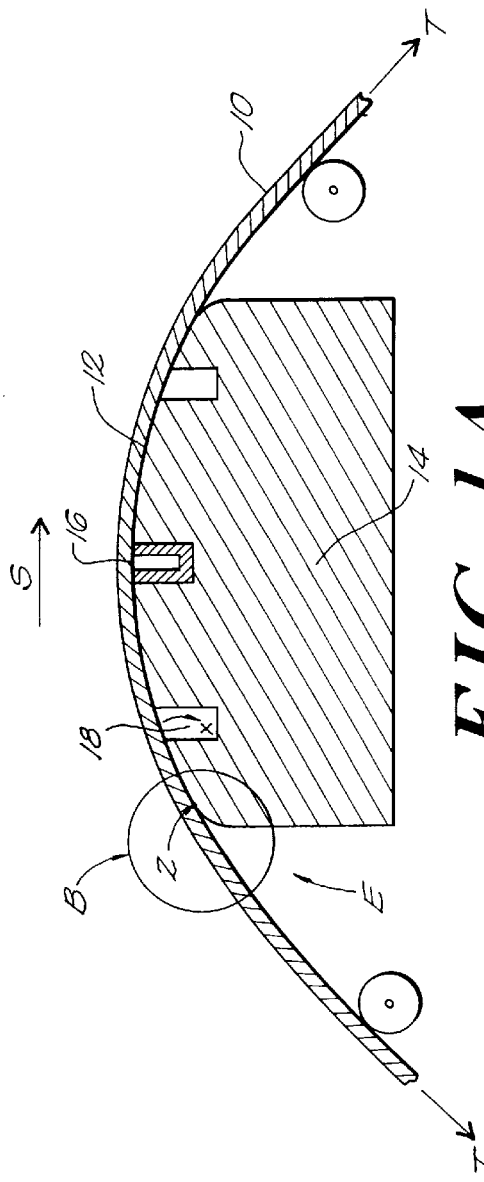
FIG. 1A is a cross-section of the prior art tape drive shown in FIG. 1, along the lines A—A.
Figure 2:
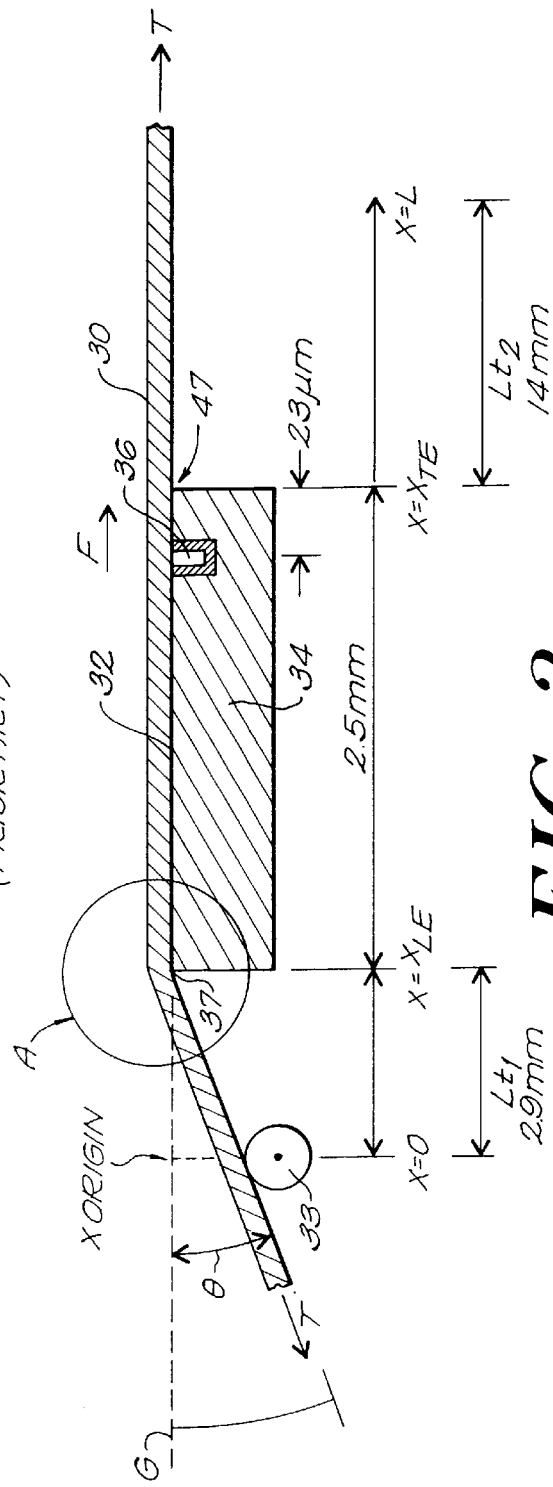
FIG. 2 is a cross-sectional view of an embodiment of a linear tape drive of the invention using a flat head with the tape wrapped around the forward direction upstream corner.
Figure 2A:
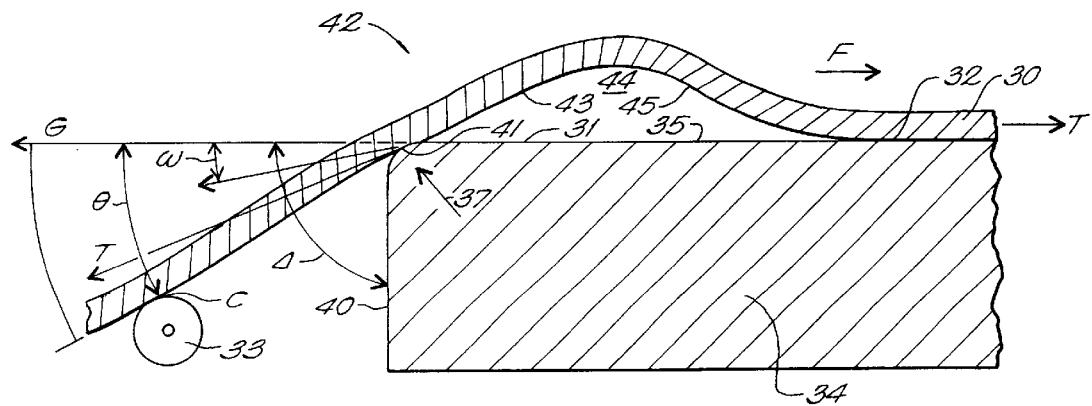
FIG. 2A is an enlarged view of a portion of the flat head embodiment of the invention shown in FIG. 2.
Figure 2B:
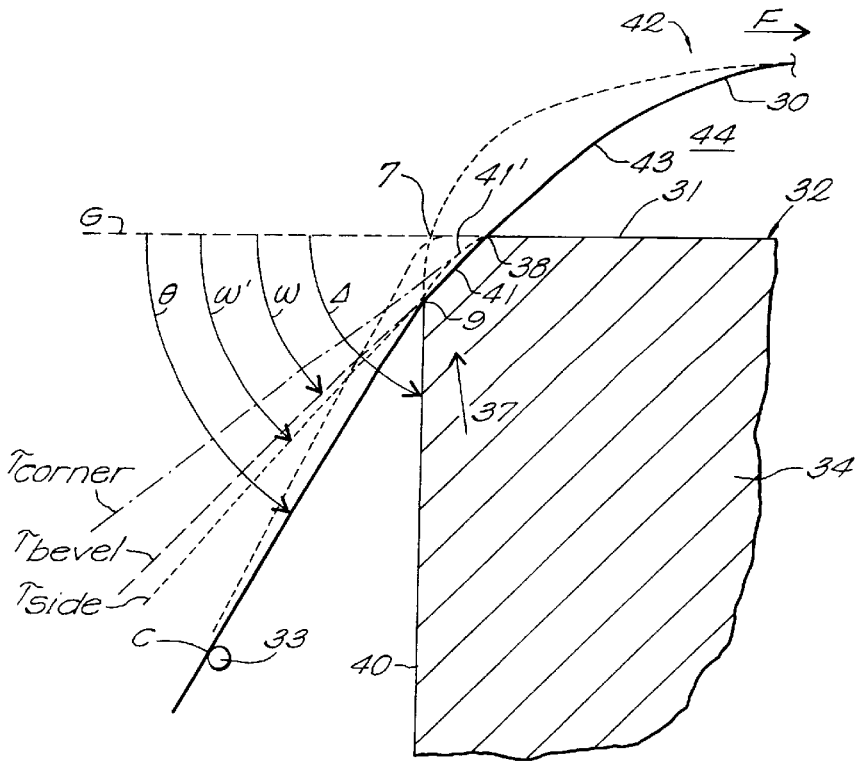
FIG. 2B is an enlarged simplified view of a portion of the flat head embodiment shown in FIG. 2A, to show the relationship among the various surfaces.

A preferred embodiment of the present invention is shown schematically with reference to FIGS. 2, 2A, and 2B, with 2A being an enlargement of the circled region A and 2B showing a portion of this region even larger, and simplified. A linear tape 30, such as a magnetic tape, moves along a travel dimension in the direction F along the signal exchange surface 32, past a signal exchange site 36. The signal exchange site may be a thin-film (TF) type element, such as has a magnetoresistive (MR) read element and an inductive write element. It may also be a conventional ceramic head typically used with tape drives. There are no relieved areas, such as shown at 18 in the prior art (FIG. 1A). The signal exchange surface 32 may be substantially flat along the entire length over which it contacts the tape 30. (Curved surface embodiments are also discussed below.) In this specification and in the appended claims, "machine dimension" shall be used to mean a dimension parallel to media travel. "Cross machine dimension" shall be perpendicular thereto, and in the same plane as the media sheet. The dimension that is perpendicular to both of the foregoing is referred to herein as the "out-of-plane" or, sometimes, "machine-normal" dimension.

It is common for tape drives to have at least one direction of travel, designated the forward direction, and an opposite direction designated "reverse." For the following discussion, the direction indicated by the arrow F will be referred to as the "forward" direction. Unless otherwise stated, it will be assumed that the tape is moving in the forward direction. Thus, components referred to as "upstream" are relatively upstream for forward direction motion, unless otherwise stated.

For a preferred embodiment, the tape is wrapped around the upstream corner 37 at an angle θ relative to a plane G that is an extension of the flat signal exchange surface 32. Tension T is applied to the tape 30, and it is caused to assume the wrap angle θ by apparatus not shown that pulls the tape around a media guide roller or pin or other suitable routing mechanism. (The media guide may also be on the other side of the tape.)

As shown in detail in FIGS. 2A and 2B, the corner 37 must be sufficiently sharp but need not be perfectly sharp. (Even if it is very sharp initially, it will wear. Further, at some level of consideration, any sharp corner is shown not to be ideal.) Wear produces a slanted surface 41 that connects the signal exchange surface 32 with an upstream side surface 40. (In FIG. 2B, An ideal sharp square corner is shown in dotted line, as well as the path the tape would follow around such an ideal corner.) The slanted surface most likely actually forms a slight curve, shown at 41' in dotted line. The angle Δ between the plane G (the extension of the signal exchange surface 32) and the upstream side surface 40 is not critical, but for practical cases it is between about 45° and 90°, and in any case sufficiently larger than θ to allow for the placement of a media support 33. (Theoretically, this surface could be totally absent, if the main surface were somehow supported, such as if it were stiff enough to be cantilevered from a more central support. Alternatively, the angle Δ could be greater than 90°, such as a knife edge.)

If a head is used that initially has a perfect sharp corner (within observable limits), it will eventually wear away approximately to a beveled corner surface, as shown. The bevel angle ω (measured between the plane G and the tangent to the bevel surface $\tau_{bevel}$) for purposes of the invention, must be<θ, and was seen to be approximately ⅙ θ for a 15.2 μm thick tape run under 87 N/m tension. The bevel is believed to wear to a curved degree governed by: $\delta \, e^{as}$, where δ is the reformation from the flat plane, in the wear zone; a is $$\sqrt{\frac{T}{D}}$$

(with T=tension and D=bending stiffness); and s is a measurement along the tape length dimension where s=0 is located at the ideal corner of 40 and 37.

It is also helpful to note that the bevel surface 41 meets the main surface 32 at a main slope discontinuity 38 and the side surface 40 at another, side slope discontinuity 9, further upstream. If the surface is a flat bevel 41, the tangents to the bevel surface at both of these slope discontinuities are coincident, and lie along $\tau_{bevel}$. If, however, the surface is a curved bevel 41', then the tangents $\tau_{corner}$ and $\tau_{side}$ of the curved bevel at the main and the side slope discontinuities respectively are not coincident, but rather intersect, with $\tau_{side}$ lying a greater angle from the plane G than is $\tau_{corner}$.

The wrap angle θ is measured counter clockwise between the plane extension G and a line along which the head contacting surface of the tape 30 travels, between a contact point C on the upstream media guide roller (or pin) 33 and the corner. The corner is considered to be the point 7 of a fresh sharp corner 37 (shown in dotted phantom), or the side slope discontinuity 9 between a worn beveled corner surface 38 and the upstream side surface 40.

It is important that the tape not simply follow the bevel tangent $\tau_{bevel}$ (or, if a curved surface, the corner side tangent $\tau_{side}$), but that it be "over wrapped" further counter clockwise around the corner away from the plane G, as mentioned, such that θ>ω, (or, if the surface is curved, ω') and, typically, nearer to 6ω. θ was seen to be approximately 6ω for a 15.2 μm thick tape run under 87 N/m tension. Such an over wrap of the tape beyond a tangent $\tau_{bevel}$ to any wear bevel surface (or, if a curved surface, the corner side tangent $\tau_{side}$) is referred to herein as an "over wrap." If the wrap is less severe than ω, air will become entrained between the tape and the signal exchange surface and may cause "flying" or self-lubrication. This is because, in such a case, the relatively gradual convergence of the two surfaces (the tape and the bevel corner surface 41 or 41') allows the air to be entrained. What is needed to prevent entrainment is a relatively abrupt convergence of the two surfaces, which results if θ>ω. What is to be avoided is a gradual convergence, such as where the two surfaces are near to parallel for some extent.

An important aspect of the invention is that with the configuration just described, the tape 30 does not tightly contact the signal exchange surface 32 immediately adjacent to and downstream of the upstream corner 37. Rather, due to tape stiffness and the over wrap described above, a bump 42 arises in the tape, such that a hollow 44 forms between the tape and the signal exchange surface, which hollow extends for a short distance. Slightly further downstream, the tape contacts the signal exchange surface 32, and maintains contact over the remaining downstream portion of the signal exchange head 34. The space between the tape and the signal exchange surfaces first diverges, 43, 31, until the bump peak is reached, and then converges downstream at 45, 35.

The hollow 44 arises because the small but finite bending stiffness D of the tape 30 prevents the tape from molding around the contour of the corner 37 and head when the tape is wrapped with the over wrap angle as described above. Rather, the tape initially follows the tangent $\tau_{bevel}$ to the beveled corner surface 41, even downstream of the bevel. (The phenomena can be observed with a sheet of paper by clamping it on a flat surface and allowing a portion to drape over. The hollow bump will be observed adjacent to the edge.) Typically, the hollow bump has a total length along the machine direction of travel on the order of $$\sqrt{\frac{D}{T}}$$

where D is the bending stiffness of the tape, and T is any tension in the tape. The hollow bump is generally a teardrop shape, with a relatively blunt end near to the corner and a relatively pointed end near to the center of the head.

When this configuration is used (such that a hollow arises) the present inventors have experimentally determined that several unexpected and beneficial conditions for tribology and recording arise: a) there is no detectable head wear after significant use, for one example, more than 2000 hours of shuttling; b) the head-tape spacing remains constant over at least a 0.5–8 m/s tape speed range, which facilitates a very good signal-to-noise ratio; and c) performance can be maintained over a very long time period.

The present inventors have shown by modeling that the constant head-tape spacing result arises because air is entrained in the interface and expands in the hollow 44 in the diverging region just downstream of the upstream wrapped corner 37. This causes the air pressure in the hollow 44 to become subambient, which results in a suction of the downstream portion of the tape in the hollow 44, toward the signal exchange surface 32, further resulting in the good contact over the remaining downstream section of the tape 30. A model of the head and tape interface is developed below. It is important to note that the hollow 44 is due primarily to the wrap angle and the stiffness of, and tension in, the tape, and suction, which takes place after the tape is set in motion. The suction modifies the shape of the tape and provides contact.

The effect differs from that described in connection with the prior art, with pressure-relief slots to maintain head-tape contact, especially at high tape speeds. In contrast, the flat-head concept of the present invention just described is considerably simpler to manufacture, and also shows good speed-independent performance and low wear. The prior art grooved structures do not provide speed independent performance.

As is mentioned above, at some level all sharp corners are beveled to some extent. But even if the corner were ideally sharp, as shown in dashed line in FIG. 2B. The tape would generally follow the same shape, as shown in dashed line, and a hollow bump would arise.

In the embodiment shown in FIG. 2, the signal exchange site 36 is much closer to the downstream corner 47 than to the upstream corner 37. That location may facilitate fabrication of the head. However, it may also be advantageous to locate the signal exchange site 36 shown roughly in the center between the upstream 37 and downstream corners, respectively.

The embodiment shown in FIG. 2 has the wrap on only the upstream corner 37. While this embodiment does provide the advantages described above, many linear tape transport systems move the tape in both the forward and the reverse directions, and require contact in both directions. A bidirectional embodiment of the invention is shown schematically in FIG. 4. All of the elements are as shown with like reference numerals in FIG. 2. Additionally, the tape 30 is wrapped around the downstream corner 47 to an angle φ, as measured clockwise between the plane G of the signal exchange surface 32 and a line between the downstream corner 47 and a contact point C' on the downstream media guide (roller or pin) 43, as explained above in connection with the upstream angle θ.

With this configuration, when the tape is moved in the reverse direction, indicated by the arrow R, a bump 52 arises in the tape 30 at the forward direction downstream corner 47 (which could also be considered the "reverse direction upstream corner"), just as does a bump 42 arise, described above in connection with the forward direction upstream corner under forward operation. The bump arises on the part of the tape 30 that faces the signal exchange surface 32. The tape should be "over wrapped" around the downstream corner 47 in the same manner as has been discussed above regarding the upstream corner 37.

The bumps arise only adjacent to the wrapped corners. The tape 30 contacts the remaining portion of the signal exchange surface 32, due to the subambient pressure that comes about because of the hollow and motion of the entrained air.

Although one might guess that the bumps 42 and 52 do not arise simultaneously, surmising that perhaps each respective bump arises only when the tape is moving in a direction that makes the bump in question the upstream bump, this is incorrect. The bumps do arise simultaneously. This is because, for the types of tape and dimensions of heads under consideration, if the tape is stationary, it forms a bow 49 (shown in phantom) from the signal exchange surface ver the entire approximately 1–3 mm extent, between both of the corners 37 and 47. When the tape moves, the subambient pressure in the currently upstream hollow creates a suction that draws the middle section of the tape down to contact the signal exchange head. However, this suction is not enough to cause the tape at the downstream corner to mold tightly around that corner. Thus, the tape rises near the downstream corner and approximates the stationary bowed shape in the immediate neighborhood of the corner.

One advantage of the invention is that it can include a head having an essentially flat signal exchange surface. There is no need to lap a precise contour radius or to machine grooves or other special reliefs. A flat surface is relatively inexpensive to fabricate. Lapping for simultaneous contour radius and submicrometer depth of the gap/signal exchange element 36 height control is difficult.

Figure 3A:
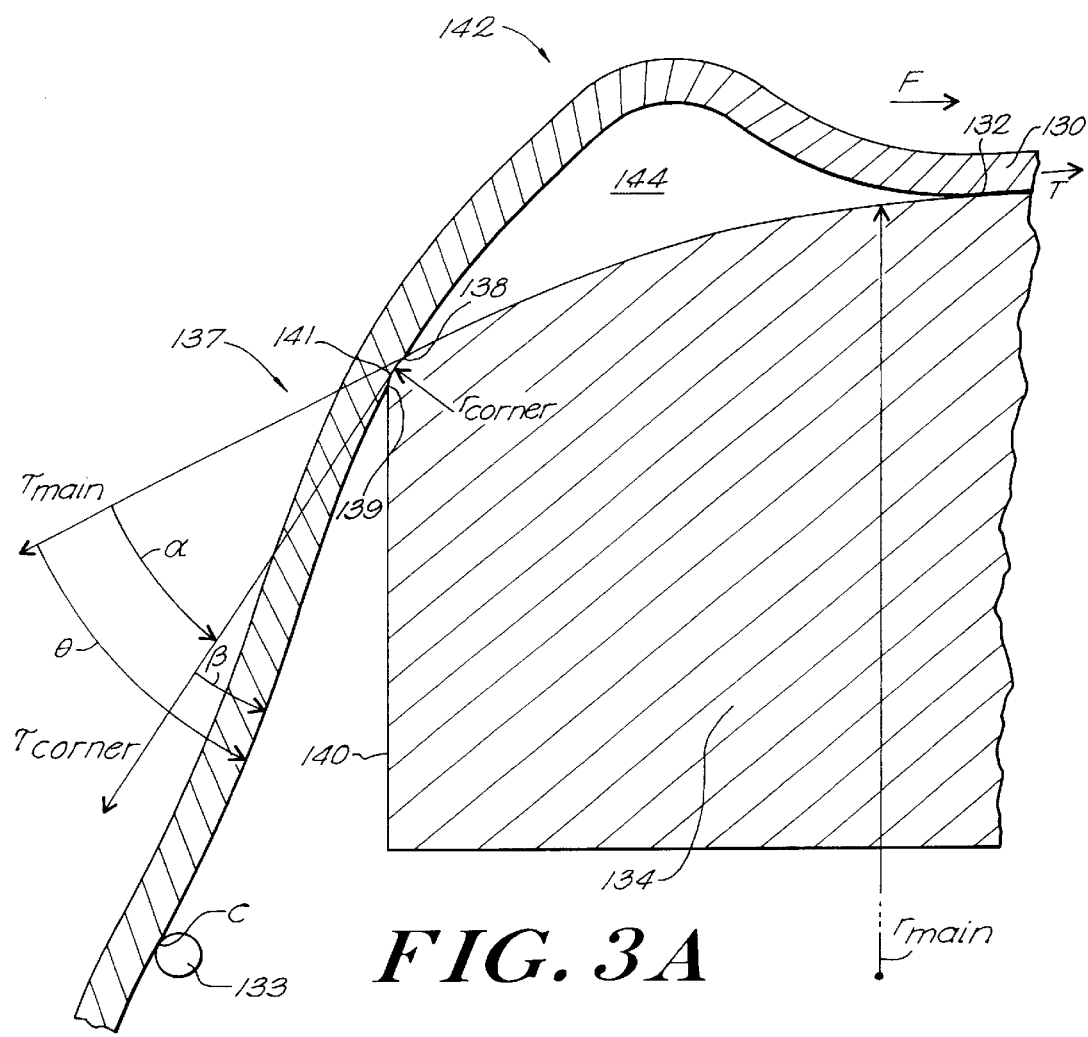
FIG. 3A is an enlarged view of a portion of the curved head embodiment of the invention show in FIG. 3.
Figure 3B:
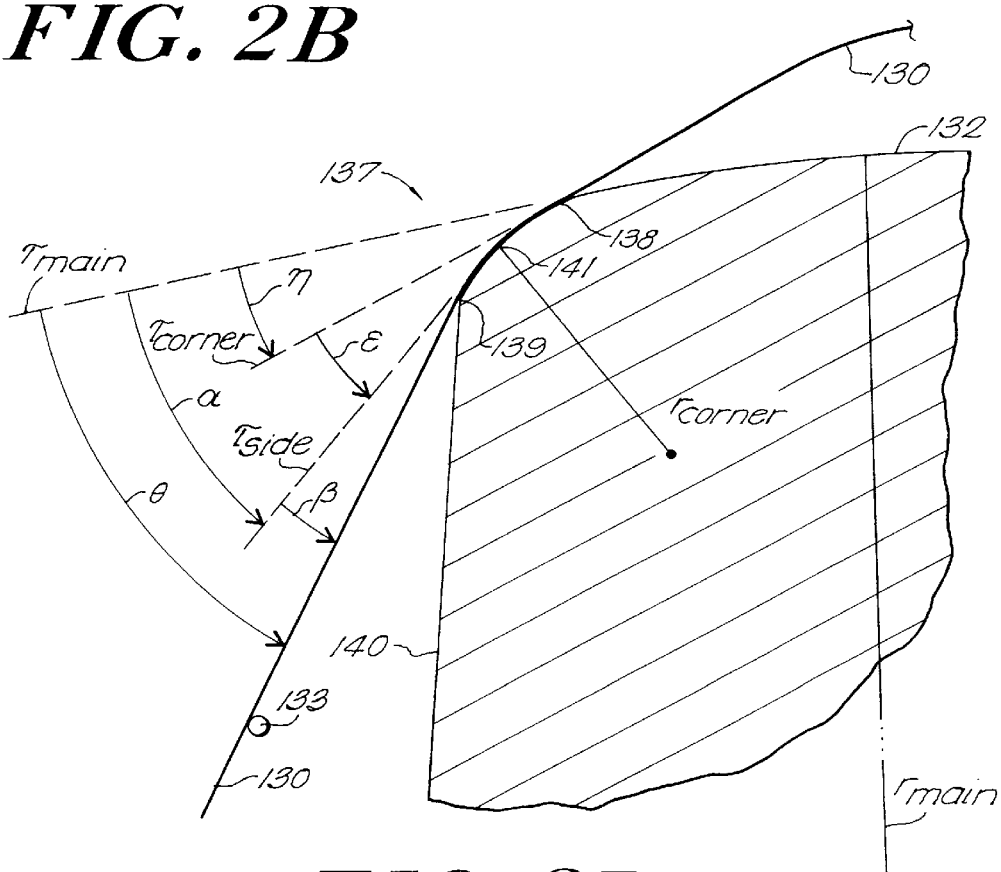
FIG. 3B is an enlarged, simplified view of a portion of the curved head embodiment shown in FIG. 3A, to show the relationship among the various surfaces.
Figure 3:
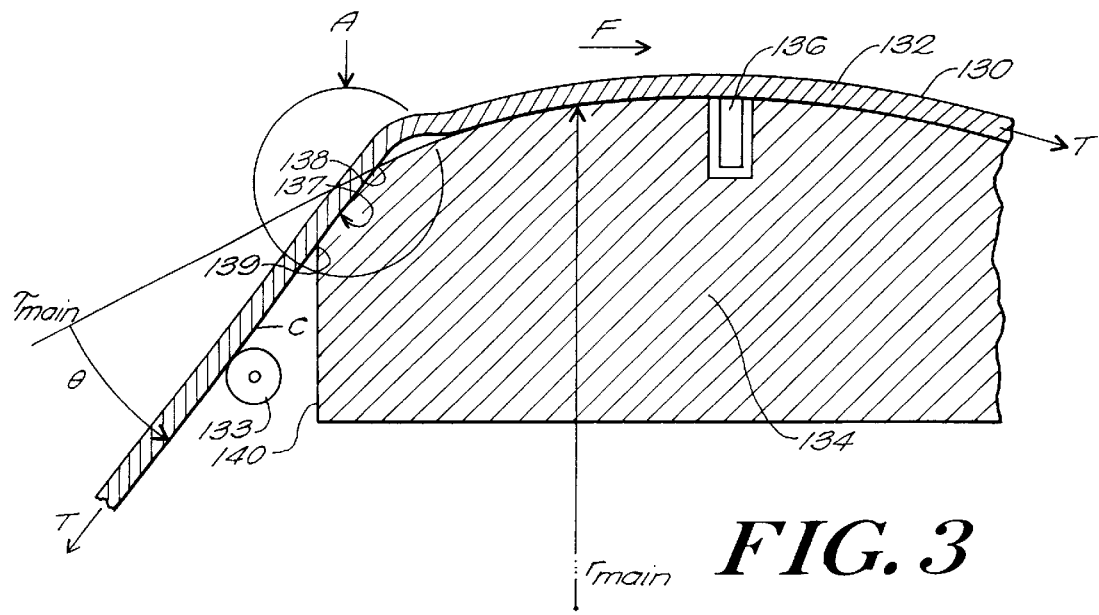
FIG. 3 is a cross-sectional view of an embodiment of a linear tape drive of the invention using a head having a curved surface, with the tape wrapped around the forward direction upstream corner.

However, it is also possible and advantageous to use the invention with a head having a surface that has a convex curve (facing toward the tape), as shown schematically in FIGS. 3, 3A, and 3B. Such a curved head will typically be necessary if contact is desired at very low speeds (<0.5 m/s).

As with the flat head, a tape 130 is pulled in a forward direction F with tension T past a signal exchange site 136 (for instance, a TF element) in the middle of a signal exchange surface 132 of a signal exchange head 134. (For the following discussion, it will again be assumed that the tape travels in the forward direction unless otherwise stated, and "upstream" and "downstream" will be used with that assumption.) The signal exchange surface 132 is not flat, as above, but is curved, for instance with a radius $r_{main}$ on the order of 20–30 mm. Joining the upstream end of the main signal exchange surface with the upstream side surface 140 is a corner surface 141, which has a curve of a radius $r_{corner}$, which is smaller than $r_{main}$, for instance, on the order of 0.25 $r_{main}$ (5–8 mm). The main signal exchange surface and the corner surface 141 meet at a main break point 138 or main slope discontinuity. At the upstream corner 137 the tape 130 is wrapped at an angle θ, measured between a tangent $\tau_{main}$ to the main signal exchange surface 132 and the path of the tape 130 immediately downstream of the upstream media support point (roller or pin) 133. The corner surface 141 and the upstream side surface 140 meet at a side slope discontinuity or interface point 139. The path of the tape 130 in this location approximates a line between a contact point C on the upstream media support 133 and the side slope discontinuity 139.

In this case, the angle θ may be thought of as being the sum of two components. A first component α is the angle between the main tangent $\tau_{main}$ to the main surface 132 at the main slope discontinuity 138, and the corner side tangent $\tau_{side}$ to the corner surface 141 at the side slope discontinuity 139. The second component β is the angle between the corner side tangent $\tau_{side}$ and the line of the tape path, between the side slope discontinuity 139 and the support contact point C. Thus, the tape is "over wrapped" in this curved head embodiment also, with the degree of overlap corresponding to the angle β.

As with the flat embodiment, it is important that θ>α, so that the tape can be overwrapped. In FIG. 3A, α is exaggerated so that the corner surface 141 and the main surface 132 can both be shown.

FIG. 3B shows the geometry at an even more enlarged scale. In addition to the components discussed above, the corner main tangent $\tau_{corner}$ to the corner surface 141 at the main slope discontinuity 138 is shown, as well as the angle η, between the main tangent $\tau_{main}$ and the corner main tangent $\tau_{corner}$, and the angle ε, between $\tau_{corner}$ and the corner side tangent $\tau_{side}$. From this it can be seen that α=η+ε.

Figure 1:
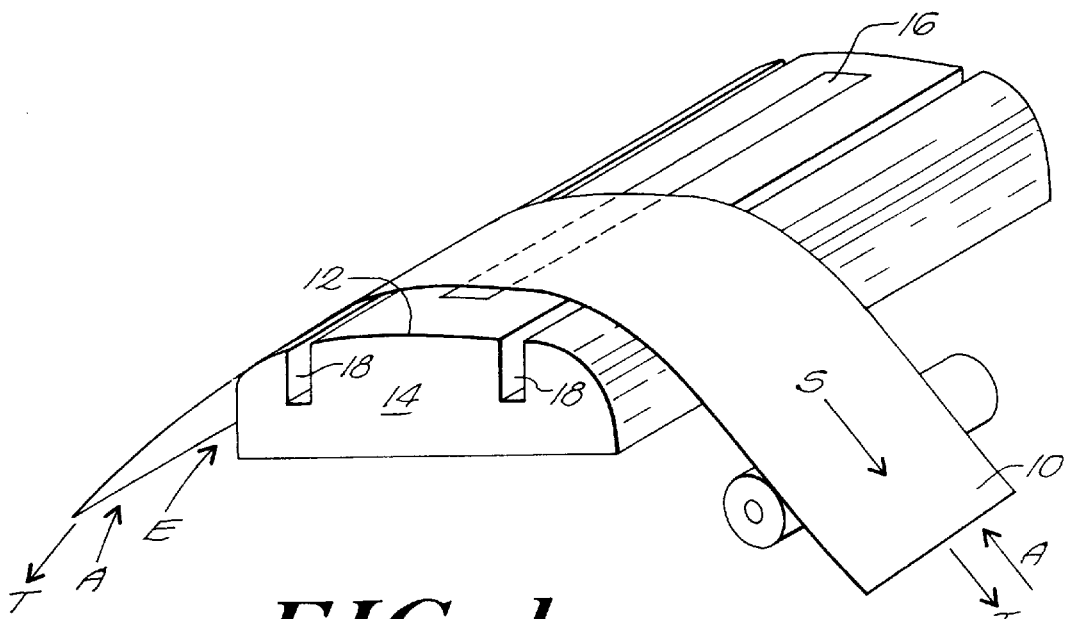
FIG. 1 is a perspective view of a head for a linear tape drive of the prior art, showing a signal exchange surface with pressure relief-slots.
Figure 1B:
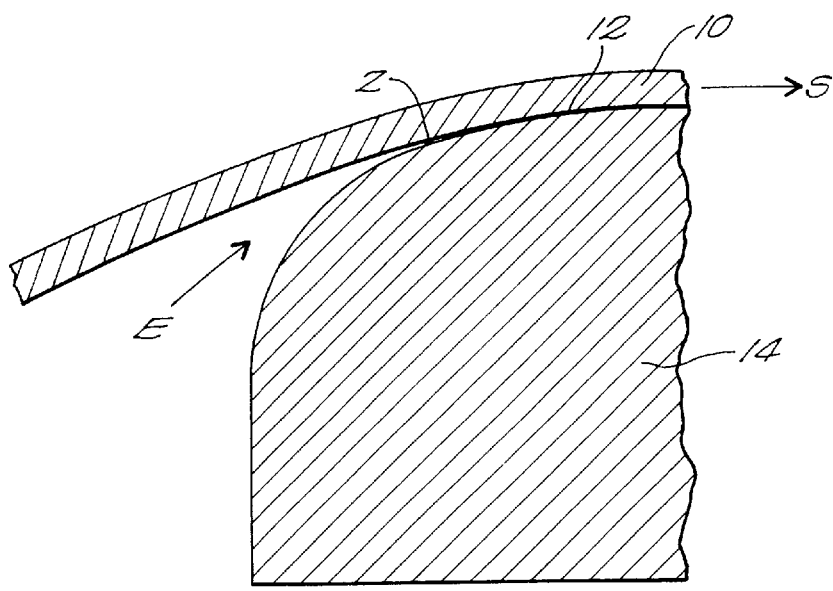
FIG. 1B is an enlarged view of a portion of the prior art tape and head interface shown in FIG. 1A.

This arrangement may look superficially similar to the prior art curved head shown in FIG. 1. However, it is not. In the prior art, the main surface 132 and the corner surface are continuous (really they constitute one surface, not two) with no slope discontinuity 138 and $\tau_{main}=\tau_{corner}$. Further, it can not be said that the tape is over wrapped past any $\tau_{side}$.

In the invention, the degree of wrap θ and the relative radii of the main and corner surfaces 132, 141 are chosen such that when the tape is moving forward under tension T, a bump 142 arises (FIG. 3A), that creates a hollow 144 into which the air that is entrained with the tape around the corner 137 can expand. A subambient pressure situation arises, which draws the tape 130 toward the signal exchange surface for the entire extent of the signal exchange surface along the travel dimension. Upstream of the corner, the over wrap of angle θ is severe enough (enough greater than α) such that insufficient air is entrained to result in a self-lubricating air flow, that would cause the tape to "fly" around the corner. Again, downstream of the corner 137 a diverging pair of surfaces is formed between the tape and the signal exchange surface, followed downstream by a converging pair of surfaces, essentially as explained in FIG. 2A and its accompanying text for the flat-head.

It is important that, except in the case of a perfectly sharp corner, there be two slope discontinuities 138, 139 at the corner. The main discontinuity 138 presents a corner around which the tape cannot perfectly mold. Thus, a bow analogous to that shown at 49 (FIG. 4) comes about when the tape is at rest, due to this slope discontinuity. The main discontinuity must be significant enough, abrupt enough, so that a bump arises that is sufficiently large to allow the entrained air to expand. Whether it is large enough depends on the stiffness of and tension in the tape. The second, side slope discontinuity 139 permits the over wrap to be established. In other words, it permits imposition of that part of the wrap θ that is labeled β. If there were no side discontinuity, the surfaces 141 and 140 would be continuous, and the tape would follow a tangent to the continuous surface. If the tape were permitted to follow a tangent to the continuous surface, then the tape and the surface would form a pair of relatively gently converging surfaces, which would entrain a relatively large amount of air, that would cause the tape to fly on an air lubrication. The presence of the second slope discontinuity permits the over wrap, and a non-zero β. This permits a pair of surfaces that present a relatively abrupt convergence, that does not entrain large volumes of air. Therefore, the tape does not "fly".

The combination of these two slope discontinuities constitutes a "sufficiently sharp corner" as used in this specification and the appended claims. In the case of a perfectly sharp corner, the two slope discontinuities can be thought of as collapsing into the single sharp corner, which serves both purposes.

Figure 5:
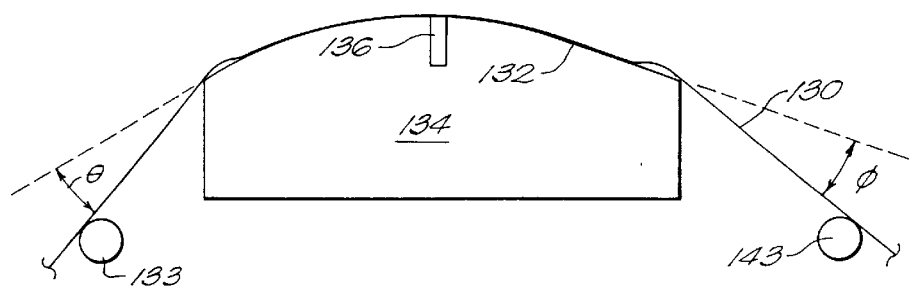
FIG. 5 is a schematic representation of a linear bidirectional curved head embodiment of the invention.

Another bidirectional embodiment of the invention also uses a curved head, with the tape being wrapped appropriately around both corners of the tape head (similar to the flat head embodiment shown in FIG. 4), as shown schematically in FIG. 5.

Typical values for the mechanical properties of the presently used tapes suitable for this invention include: Thickness=6–27 μm; Modulus of Elasticity=4–5 GPa; and Poisson's Ratio=0.25–0.35.

Rotating Disk

Figure 6A:
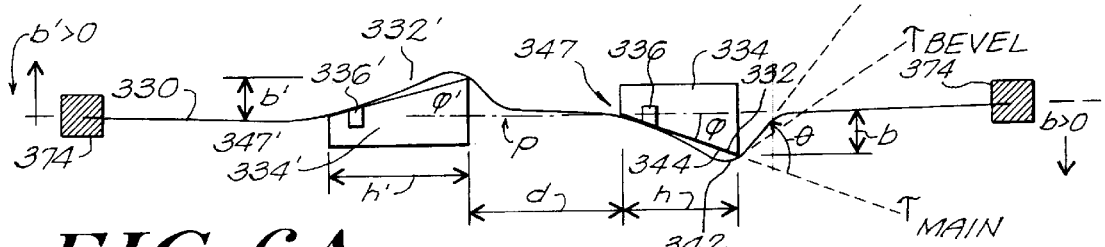
FIG. 6A is a cross-sectional representation of the embodiment of the invention shown in FIG. 6, along lines A—A.
Figure 6:
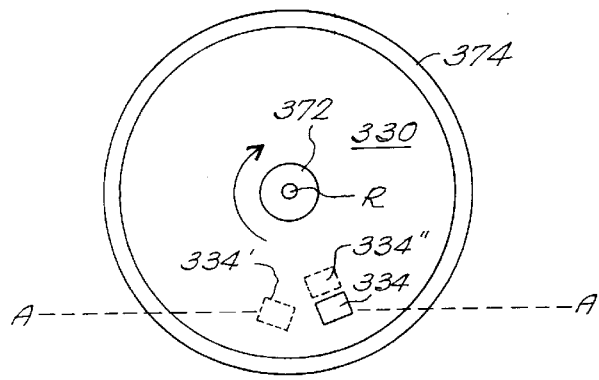
FIG. 6 is a top view, schematic representation of an embodiment of the invention for use with a rotating planar media, such as a floppy magnetic disk where a pair of heads are inclined relative to a reference plane R.

Another embodiment of the invention, configured with a rotating flexible media, such as a magnetic floppy disk, is shown schematically with reference to FIGS. 6 and 6A. FIG. 6A is a cross-sectional view of the disk embodiment of the invention shown in FIG. 6, along lines A—A. In general, the same design principles apply. A disk 330 of magnetic media rotates clockwise as viewed from above, around an axis R, such that the portion shown closest to the reader (in FIG. 6A) moves from right to left as shown. (For reference purposes, one face of the disk, for instance, the upper face, is referred to as the "signal face" and the other face is referred to as the "obverse face." This designation becomes rather arbitrary if the disk is two sided.) The disk rotates through a nominal register plane P, which divides the space into two regions, above and below it as shown. (For purposes of reference, the portion above the plane as shown is referred to as the "signal region" and the portion below the plane is referred to as the "obverse region." This designation is arbitrary, particularly when considering two sided disks, as specifically addressed below.) (For the rotary embodiment, the machine dimension is circumferential, relative to the rotating disk, and the cross-machine dimension is radial.) The present invention is particularly useful with a type of disk known as "stretched surface," where the disk 330 is stretched in a radial direction between the hub 372 and a circumferentially surrounding ring 374. This provides tension along the radial dimension, which has an effect that is analogous to that of the tension in the linear arrangement described above. (The invention may also be useful in connection with un-stretched surfaces, in which case the tensioning ring would not be present. If the disk is unstretched, it is thought that the invention would be most useful for disks that rotate at very high speeds. It may also be possible to orient the heads to find a balance between the floppy disk's restoring force and the air bearing suction even in a non-stretched surface application.)

An upper signal exchange head 334 protrudes through the register plane P contacting the signal face of the disk 330, such that the portion of the disk 330 that contacts the upper head and adjacent upstream and downstream sections is pressed and deflected out of the register plane P. The portion of the disk 330 that is upstream of the upstream corner 337 of the upper head 334 is deflected below the register plane P into the obverse region, while the portion of the disk that is downstream of the upstream corner 337 of the head is also deflected out of the register plane P, also into the obverse region, but only slightly. Some part of the disk media downstream of the upper head 334 may even be deflected to the other side, above the register plane, although this need not happen. The portion of the disk media 330 that approaches the upper signal exchange head 334 is inclined an angle $\theta$ relative to the planar signal exchange surface 332. This slight incline, combined with the disk motion, results in a bump 342 and hollow 344 at the upstream corner 337, just as described above in connection with the linear tape systems. The same advantages arise. The bump arises and a negative pressure air bearing draws the portion of the disk downstream of the upstream corner 337 and bump 342 toward the head surface 332, bringing the two into contact. This contact persists along the signal exchange surface downstream to and including the signal exchange site 336, establishing the good signal transfer conditions discussed above.

Wear at the upstream corner and the signal exchange site is also reduced. The signal exchange head 334 may be fixed in its position protruding into the plane, or it may be retracted to a rest position, and subsequently advanced to the contacting position shown in FIG. 6.

In general, the angle $\phi$ between the register plane P and the signal exchange surface $\phi$ can be zero or non-zero. If it is zero, the signal exchange surface 332 will be parallel to the register plane R. In the tilted situation, the signal exchange site 336 may be on either side of the register plane P, depending on the degree of tilt of the surface $\phi$ to the plane P, the length h of the machine dimension of the surface 332, the intrusion b of the upstream corner 337 past the reference plane R and the stiffness of the disk medium.

Also in general, the degree b to which the head protrudes past the reference plane P must be such that the angle formed between the upstream side wall of the head and the sloping disk surface is abrupt enough so that the amount of air that is entrained is insufficient to cause the disk to "fly" around the head. Further, it must be enough, coupled with the shape of the surface 332 and the angle $\phi$ so that the disk cannot mold itself around the upstream corner 337, but rather forms the hollow bump discussed. Further, $\phi$ must be small enough so that the downstream portions of the signal exchange surface are close enough to the deflected disk, so that the disk can be drawn to the surface by the negative pressure resulting from the entrained air expanding into the hollow. It is helpful if the slope of the signal exchange surface 332 asymptotically approaches the natural curve that the disk will assume as it is being drawn toward the signal exchange surface.

In general, all of the above discussions regarding the shape and sharpness of the upstream corner in the linear tape embodiment apply also to the upstream corner 337 of the head 334. The corner may be an ideally sharp corner, or, more realistically, a worn bevel, either flat or curved. The overwrap of the disk around the corner is evaluated with respect to the appropriate tangent to the bevel surface, as discussed above, whether the bevel is flat or curved.

It is also common for floppy disk drives to read and write on both the upper and lower surfaces of the disk. The invention can be advantageously used with two heads, 334 and 334' as shown in FIG. 6A (with the lower head 334' being shown schematically in phantom in FIG. 6, below the disk). In the embodiment shown, the lower head 334' is downstream of the upper head 334. The lower head 334' also has its signal exchange surface 332' inclined $\phi$' relative to the register plane P, and is otherwise oriented as would be the upper head 334 if reflected around the register plane P. The lower signal head 334' protrudes through the register plane P such that a portion of the disk 330 that contacts it and adjacent upstream and downstream sections are deflected out of the register plane, in a mirror fashion of the deflections that occur adjacent the upper head.

As shown in FIG. 6A, the upper and lower signal exchange heads 334, 334' are spaced far enough from each other, a distance d along the machine dimension, that the portion of the disk that is downstream of the upper head 334, between the upper and the lower heads, returns to or close to the register plane P. However, if the upper and lower heads are spaced closer together circumferentially along the direction of motion, it may be that this inter-head portion of the disk remains displaced from the register plane P, in this case, above it for some distance, until it comes under the influence of the lower head 334'. For the floppy disk drive embodiment shown in FIG. 6A, the signal exchange heads have the signal exchange site 336, 336' located asymmetrically, being much closer to the downstream edge of the head than the upstream edge. This is because the floppy disk drive embodiment is for only unidirectional disk media motion. Therefore, it is not necessary to wrap the media around the downstream edge 347, because it will never be an upstream edge in a reverse direction mode of operation. By not wrapping the downstream edge, the possibility of wear of the relatively soft thin film elements of the signal exchange site is minimized. On the other hand, it may be useful to wrap both corners, such as by providing $\phi$, $\phi'=0$, and b and b' are both greater than zero. The upper and lower angles $\phi$, $\phi'$ may be equal or unequal.

As shown in FIG. 6A, the upper head 334 and lower head 334' are at substantially equal radial locations, being spaced a part circumferentially. It is also possible for the lower head to be at an equal circumferential location but a different radial location, as shown schematically at 334" (FIG. 6). In general, the same design principles apply, except that the deflected disk shape will be different, with more complicated radial shapes. These must be considered. Floppy disks that are currently used have a thickness on the order of 75 $\mu$m, which is considerably thicker than the tapes discussed above. A typical speed for a 3.5 inch floppy drive is 3600 rpm.

Helical Wrap

Figure 7:
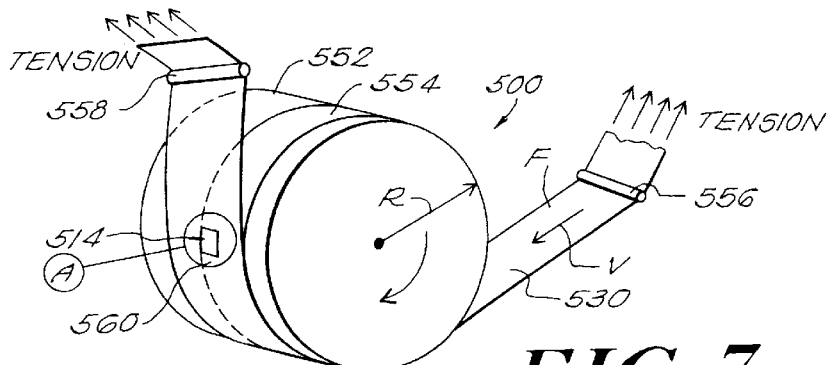
FIG. 7 shows schematically in perspective view an embodiment of the invention having a helical scanner with tape wrapped along a helix on the scanner surface.

An embodiment of the invention that incorporates the hollow bump tape configuration with a helically wrapped tape is shown with reference to FIGS. 7, 7A, 7B and 7C. FIG. 7 shows the general configuration of a helical scanner. Such an arrangement is commonly used in video recorders and players. In general, a scanner 500 includes two drums, one stationary 552 and one 554 that rotates clockwise, as shown. A tape 530 is wrapped along a helix around the scanner drums. The speed of the scanner relative to the tape can be as high as 50 m/s. The tape also moves relative to a reference, but slowly (on the order of a few mm/s) along the direction indicated by the arrow v. Typically, such drives only operate in one direction (nominally called "forward"). Thus, if the rotating drum is considered to be a stationary reference, the tape appears to be moving in the direction F. shown in FIG. 7A. As such, the corner 537 is upstream, with respect to the relative tape and head motion. The tape is supported by upstream and downstream supports 556, 558 respectively (which do not perform the same function, relative to the invention, as the guides mentioned above). Tension is also applied to the tape.

At the edge of the rotating drum that is adjacent to the stationary drum, is a head window 560, in which sits a head 514. In the prior art, as shown schematically in cross-section in FIG. 7C, the head protrudes about 5–60 $\mu$m past the surface of the rotating drum. The dimension of the head along the travel dimension, along which tape travels, is on the order of 1 mm. There may be a plurality of windows and heads around the drum, for instance 2, 4, 8, etc. Each individual head traces out a number of spaced apart paths across the width of the tape, at an angle that depends on the helix angle. The helical scan configuration results in an efficient use of the width of the tape at relatively high tape to head speeds, without requiring moving large quantities of tape at high speeds. As a tradeoff for this efficiency, it is necessary for each individual head to break and make contact with the tape every time the head in question comes around for another rotation. Further, the signals from the various tracks must be organized in a manner commensurate with their recording, which may require more complex mechanical systems and signal processing.

The prior art (FIG. 7C) head 514 has a rounded signal exchange surface 512, sized and positioned like the curved heads of the prior art linear drives, so that the tape wraps substantially tangent to the curved surface, and no hollow bumps appear.

With the head of the helical embodiment of the invention, a signal exchange site 516, is typically located near to the downstream corner 547 of the head 534, because, like the disk drive, the helical wrap application is unidirectional, and there is typically no need to wrap the downstream edge. In fact, it may cause unwanted wear. The upstream and downstream corners 537, 547, respectively, are not rounded. The upstream corner 537 is sharp, so that the tape 530 does not drape smoothly over the surface, but rather also forms a hollow bump 542 at the upstream corner. The bump is caused by the same phenomena as described above: the tension, stiffness and sharpness of the upstream corner. The bump also gives rise to the subambient condition, which draws the tape toward the head, thereby keeping the two in contact over the entire head downstream of the bump.

Figure 7A:
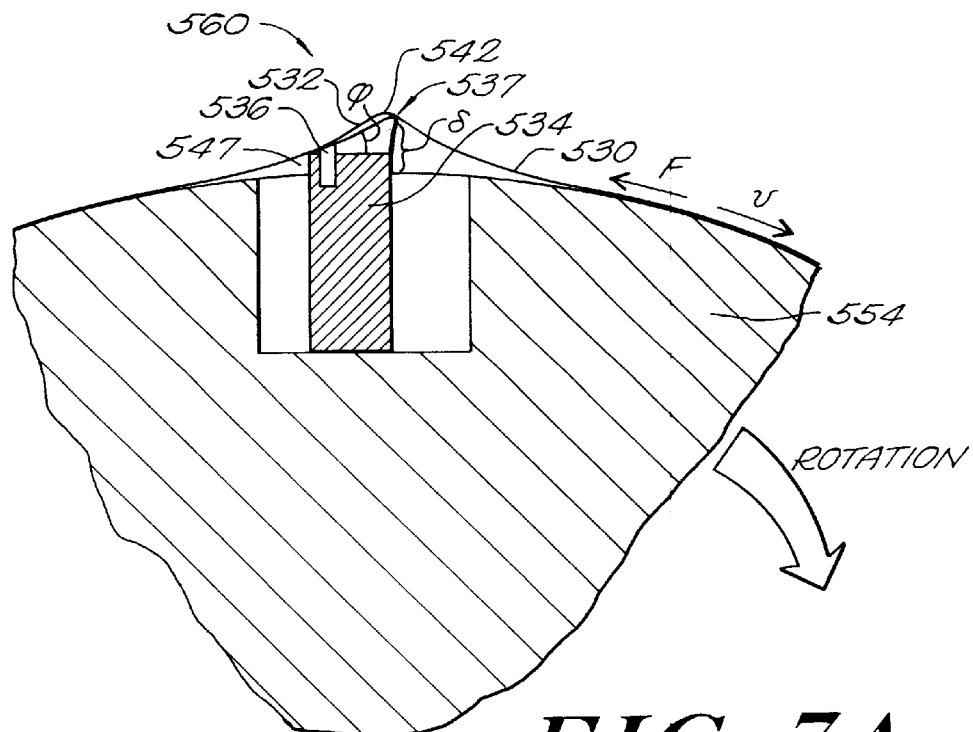
FIG. 7A shows schematically an enlargement in cross-section of the portion of FIG. 7 designated A.
Figure 7B:
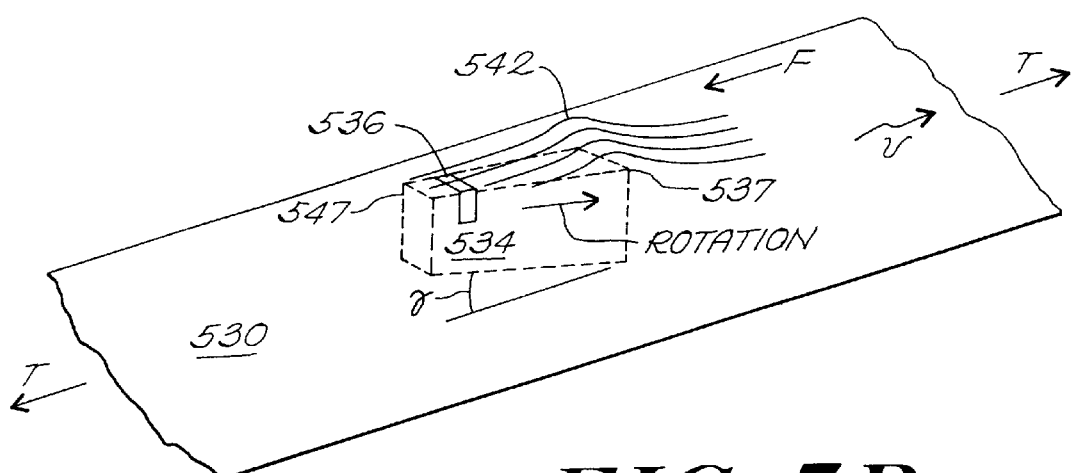
FIG. 7B shows schematically an enlargement in perspective view of the portion of FIG. 7 designated A.

The embodiment of the invention is also shown partially in perspective view in FIG. 7B, where the helix angle $\gamma$ is indicated.

This embodiment has the same advantages as the linear and the disk embodiments. Reduced head wear is expected. Contact is maintained (spacing is virtually invariant with respect to speeds p to about 40 m/s). (Among the magnetic media known today, only rotary head drives can make use of such high head-to-tape speeds.)

The head for the helical scan has been shown in FIG. 7A to be inclined an angle $\phi$ relative to the tape, with a wrap only, or predominantly, at the upstream corner, which protrudes a distance $\delta$ past the surface of the drum along which the tape travels. However, as with the disk drive embodiment, the angle $\phi$ could be varied, or could be zero, in which case the head surface 532 would be substantially parallel to the drum surface. In that case, both corners would be wrapped, and the degree of wrap would depend on the distance $\delta$. As shown, the angle $\phi$ is such that the upstream corner is elevated (with respect to the drum circumference) relative to the downstream angle and thus, the upstream corner is more severely wrapped. However, the sign of the angle $\phi$ may be reversed, such that the upstream corner is depressed compared to the downstream angle and the downstream corner would be more severely wrapped.

Figure 7C:
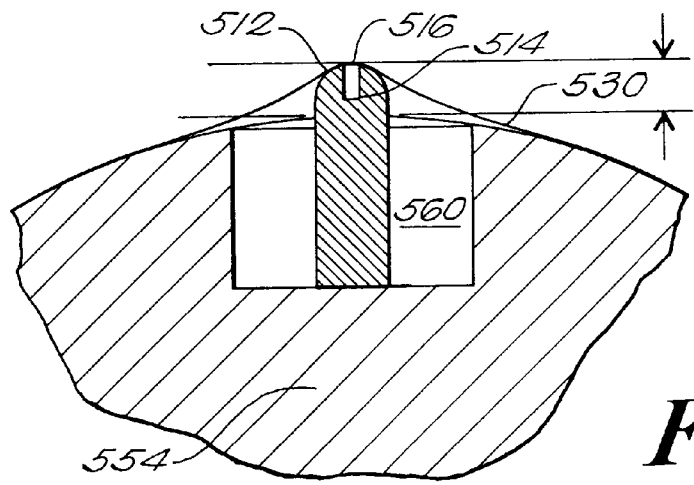
FIG. 7C shows schematically an enlargement in cross-sectional view of a portion of a prior art helical scanner, that corresponds to the portion of the helical embodiment of the invention shown at A in FIG. 7.
Figure 7D:
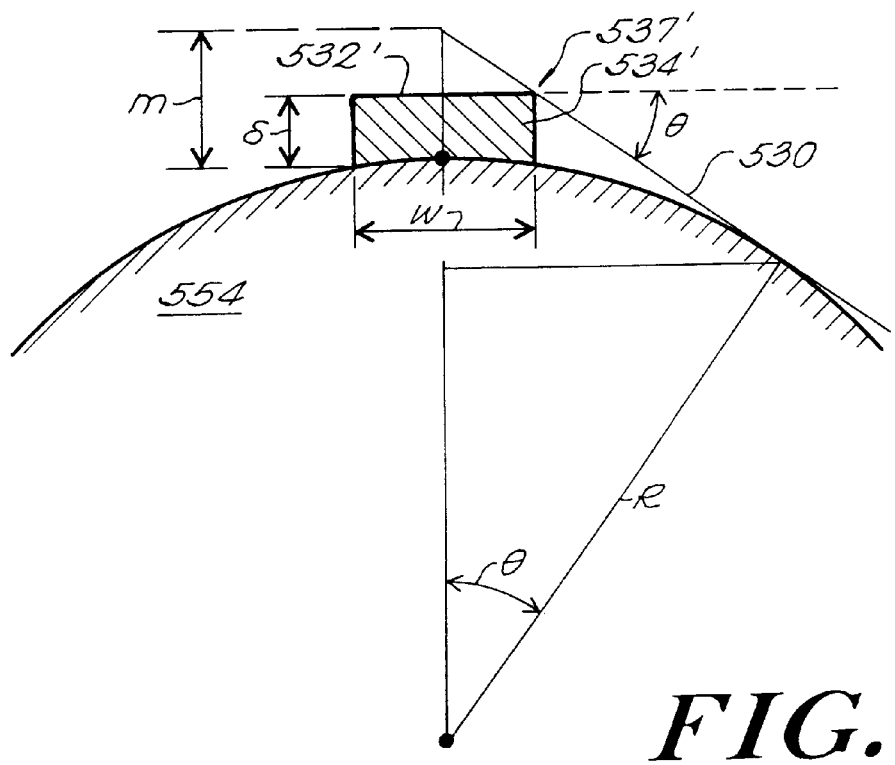
FIG. 7D shows schematically an enlargement in perspective view of the portion of FIG. 7 designated A, for a flat surface head, including geometrical constructs for analyzing the relative sizes of its elements.

In general, the protrusion distance $\delta$ will depend on the desired wrap angle $\theta$, (specified by the design principles discussed above, in connection with the linear embodiment) the length w of the head circumferentially along the machine dimension, and the radius R of the rotating drum. The geometrical relationships among these parameters for a flat head 534' with a signal exchange surface 532' that is roughly parallel to the drum surface in its circumferential location is shown in FIG. 7C. The wrap angle $\theta$ is measured between a tangent $\tau_{main}$ to the signal exchange surface 532' and the path that the tape 530 follows, from the corner 537' of the head to the drum 554. For illustration purposes, the bump that forms in the tape, and the portion of the tape 530 that would be downstream of the corner 537' is not shown.

From the diagram shown in FIG. 7C, it can be shown that $$m = R\left(\frac{1}{\cos\theta} - 1\right). \tag{A}$$

from this relation, it follows that the distance of head protrusion $\delta$ is as follows:

$$\delta = R\left(\frac{1}{\cos\theta} - 1\right) - \frac{w}{2}\tan\theta. \tag{B}$$

Using this expression, various distances of protrusion $\delta$ are shown in Table A for different combinations of drum radius R, head length w (both expressed in meters (m)) and wrap angle $\theta$ (in degrees). The units for $\delta$ are micrometers ($\mu$m)

TABLE A

| HEAD WIDTH m | $1 \times 10^{-3}$ | $1 \times 10^{-3}$ | $1 \times 10^{-3}$ | $2 \times 10^{-3}$ | $3 \times 10^{-3}$ |
|---|---|---|---|---|---|
| Drum Radius m | $1.5 \times 10^{-2}$ | $2.5 \times 10^{-2}$ | $5.0 \times 10^{-2}$ | $5.0 \times 10^{-2}$ | $5.0 \times 10^{-2}$ |
| Wrap Angle [°] | | | | | |
| 1.5 | | | 4.05 | | |
| 2.0 | | | 13.00 | | |
| 2.5 | | 1.99 | 25.80 | 3.97 | |
| 3.0 | | 8.10 | 42.40 | 16.20 | |
| 3.5 | | 16.10 | 62.90 | 32.30 | 1.69 |
| 4.0 | 1.67 | 26.10 | 87.10 | 52.20 | 17.20 |

TABLE A-continued

Table A: Head protrusion δ (in micrometers (μm)) for combinations of helical drum radius R, head length w (both in meters (m)) and wrap angle θ (in degrees).

Multiple Head Narrow Track

Figure 16A:
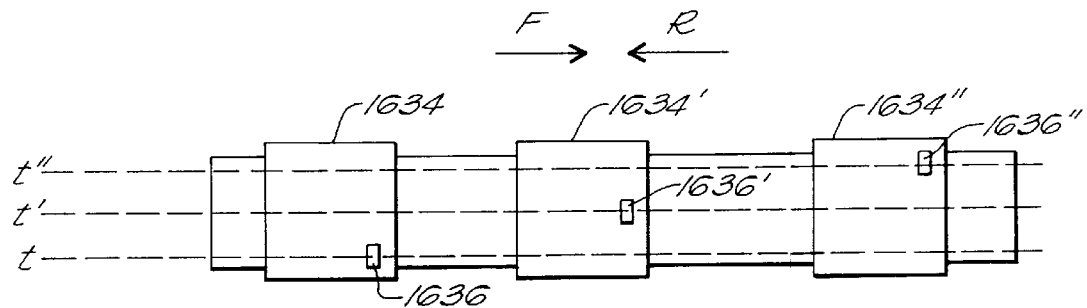
FIG. 16A shows schematically a side elevation of an embodiment of the invention for use with multiple narrow tracks, showing several heads that are spaced around the arc of a curve, angled with respect to each other, and also offset with respect to each other.
Figure 16B:
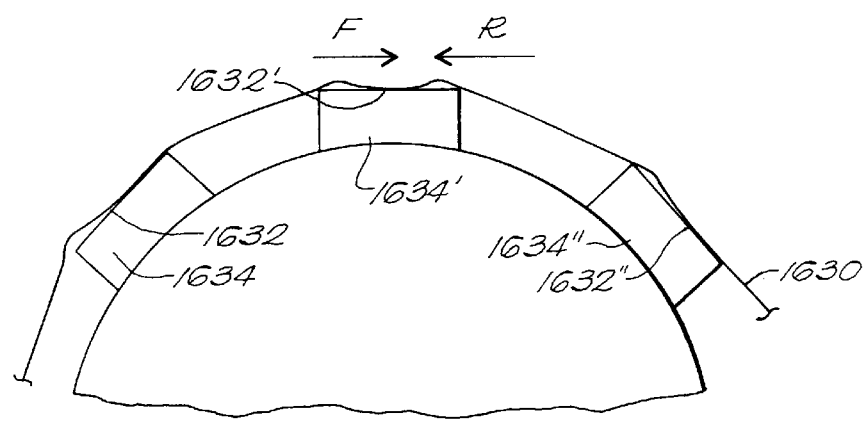
FIG. 16B shows schematically a plan elevation of the multiple head, narrow track embodiment of the invention shown in FIG. 16A.

Another useful embodiment of the invention is shown schematically in plan view in FIG. 16A and in side elevation in FIG. 16B. This embodiment incorporates several heads that are angled and offset laterally with respect to each other. As shown in FIG. 16A, a first head 1634 is most upstream in a configuration where the tape (not shown in FIG. 16A) moves forward along the direction of the arrow F. The signal exchange site 1636 is located toward an extreme side, in the cross-machine dimension, for the most upstream head 1634. A second head 1634' is located further downstream, and also has a signal exchange site 1636', which is offset laterally relative to the signal exchange site 1636 of the first head 1634. The offset signal exchange site is offset along the cross-machine dimension, closer to the center of the head 1634 along this dimension than is the signal exchange site 1636. Thus, the two signal exchange sites 1636 and 1636' will read from adjacent tape tracks, indicated by the dotted lines t and t', respectively. Similarly, a third head 1634" is further downstream from the first two, and has a signal exchange site 1636" that is offset further along the cross-machine dimension from the signal exchange site 1636 of the most upstream head 1634, so that it reads from the track t".

FIG. 16B shows the arrangement of these heads from the side. They each have a signal exchange surface 1632, 1632' and 1632", as discussed above, which signal exchange surfaces (even if flat) are not coplanar. Rather they are inclined relative to each other, and spaced from each other, so that the tape 1630 passing from one head to the next is overwrapped, as discussed above, such that a hollow bump arises at the upstream edge, and typically also at the downstream edge, as discussed above. The upstream head is supplied with tape from a media support so that the required angle is achieved. (The relative angle between the heads shown in FIG. 16B is exaggerated for illustration purposes.) In this embodiment, a relatively upstream head (for the direction in question) serves as the upstream media guide for a relatively downstream head. If the apparatus is configured for bidirectional operation, then a relatively downstream head (forward direction designation) serves as the media guide for a relatively upstream head, during reverse direction operation.

Thus, the embodiment shown in FIGS. 16A and 16B can read from multiple narrow, adjacent tracks across the width of the tape. The head may be stationary, with the tape trained around it, or the head may rotate. The signal exchange surfaces can be flat, as shown, or curved, as shown in FIGS. 3 and 5 above. The tape can run in either direction F, or R. It is also beneficial to actuate the heads individually, so that they may be moved in the cross-machine dimension, such as for calibration or more efficient use of the width of the tape.

EXPERIMENTAL RESULTS

A row-bar of thin-film disk-heads, ordinarily used in hard disk drives, was used to evaluate their read-performance for high speed and high density, contact tape recording using two different video tapes. The read-elements on these disk-heads were 3.75 μm wide (in the cross-machine dimension), ~7 μm long (in the machine dimension, including the shields) and 2 μm deep (in the out-of-plane dimension) magnetoresistive (MR) heads. These heads were deposited on a hard $Al_2O_3$—TiC (Altic) substrate, the deposited layers are sputtered $Al_2O_3$ (alumina) as undercoat, gap-spacer and overcoat, and $Ni_{0.2}Fe_{0.8}$ (Permalloy) as shield and pole-pieces and MR element layers. The thickness of the thin-film layer is ~30 μm. Altic surface constitutes most of the load bearing surface shown in FIG. 2. The sputtered and plated materials are all much softer and less wear resistant than the Altic substrate.

The tapes used in the evaluation were 2.54 cm wide SVHS-like (Sony DK15500) and 1.27 cm wide WVHS-like (Fuji) tapes. The WVHS is a double coated advanced metal particle (MP++) tape and the SVHS is a smooth, fine particle Co—γ—$Fe_2O_3$ tape. It has the following mechanical properties: thickness c=15 μm; Elastic Modulus E=4 GPa; Bending stiffness $$D = \frac{Ec^3}{12(1-v^2)};$$

and Poisson's Ratio v=0.3. The SVHS and WVHS tapes were shuttled for 2,000 hours and 120 hours in the forward direction as shown in FIG. 2 at 8 m/s, respectively. In the reverse direction, used here as a rewind, the tape "flew", namely did not contact the head, due to entrained air lubrication. The experiments were carried out on a Metrum 96 tape drive available from Metrum, 4800 East Dry Creek Rd., Littleton Colo., and 87 N/m of tape tension was supplied by vacuum columns.

The tapes were not changed for two reasons; a) the primary goal of the experiment was to investigate narrow track playback characteristics of the thin-film MR heads, and b) in the Very Long Baseline Interferometry method used in radioastronomy, for which it is hoped to use the invention, virgin tapes are not used. In addition to this, others have found that the long term abrasivity of these tapes is very low.

In the forward direction, the head-tape spacing over the signal exchange read/write gap remains essentially constant in the one-half to eight meters per second speed range under 87 N/m tension. No more than 4 nm of wear of the read element occurred after 2000 hours of shuttling in contact. This upper limit on wear was inferred from an undetectable change to 0.02% in the MR element resistance. Wear of more than 4 nm would have produced a detectable change in resistance.

The row-bar used was 5.08 cm wide along the cross machine dimension. The tape was run only on one side of this row-bar and the other side was left untouched. At the end of the experiments the surface of the row-bar was probed with a stylus profilometer (Dektak-8000 with 2.5 μm radius tip). The surface on which the tape was run was compared against the virgin surface.

Figure 8A:
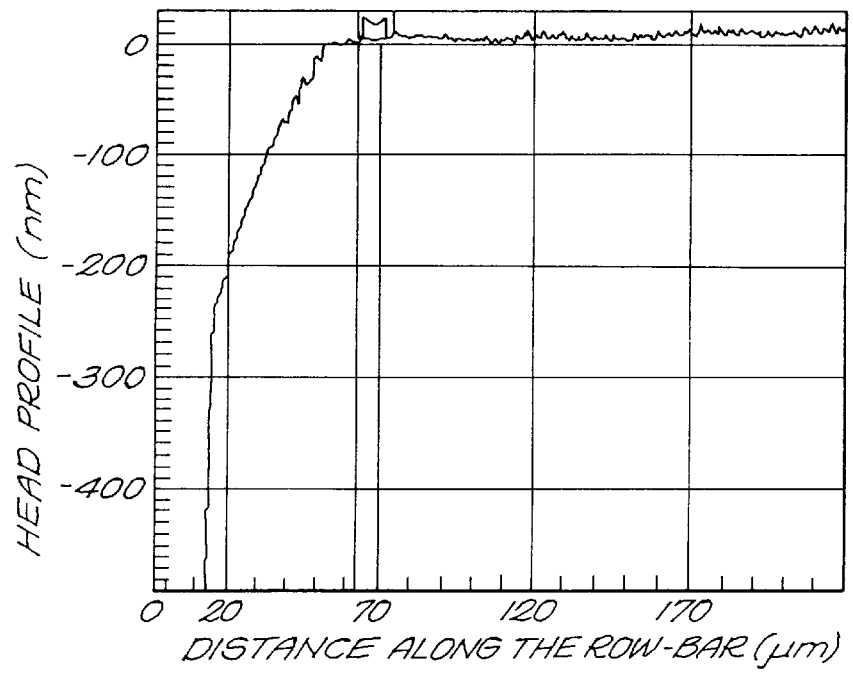
FIG. 8A shows graphically the upstream edge wear on the contact surface measured with a mechanical surface profiler for the wrap geometry shown in FIG. 2, after over 2000 hours of running in contact.
Figure 8B:
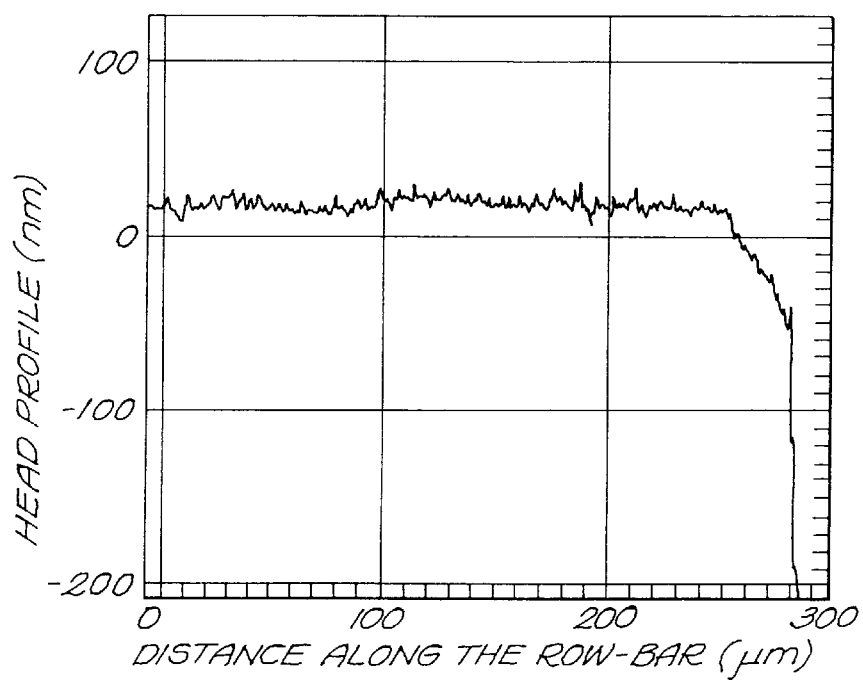
FIG. 8B shows graphically the downstream edge wear on the contact surface, measured as for FIG. 8A.

The surface profile measurements were made at five different locations on each worn edge and the results were averaged. Typical measured surface profile traces for the upstream and downstream edges are given in FIGS. 8A and 8B, respectively. The surface profiles on the virgin head surface do not have the wear shown on this figure. The upstream edge was worn to a 33 μm long (along the machine dimension) by 238 nm deep (along the out-of-plane dimension) "bevel". The downstream (softer, but not wrapped) edge also showed some wear, but this was less than the upstream edge. Here, the average wear in the machine and out-of-plane dimensions were 29 μm and 83 nm, respectively. This is not inconsistent with the 4 nm upper limit on MR element wear mentioned above, since the MR element is located in the region where the wear in the out-of-plane dimension is on the order of 4 nm.

MODELING THE HEAD-TAPE INTERFACE

In order to gain a better understanding of the phenomena at play, and their variations, modeling was investigated. (Muftu and Hinteregger explains the model parameters, and is hereby incorporated fully by reference herein.) The tape displacement can be modeled with the equation of equilibrium of a moving infinitely wide plate (Muftu and Benson, Modelling). Cross machine wise variations in tape deformation are neglected. At steady state the equation of equilibrium for a moving plate is $$D\frac{d^4w}{dx^4} + (\rho V^2 - T)\frac{d^2w}{dx^2} = p_{net} + p_c, \quad (1)$$

where: the out-of-plane (machine-normal) tape displacement, for instance at the bumps, is w; bending stiffness of the tape is $D=Ec^3/12(1-\upsilon^2)$; the tape tension is T; the tape transport speed is V; the gage pressure is $p_{net}=p-P_a$; the ambient air pressure is $P_a$; the contact pressure is $P_c$; the modulus of elasticity of the tape is E; Poisson's ratio of the tape is $\upsilon$; tape thickness is c; the coordinate axis along the undeflected tape is x with an origin at a point in the plane G on a perpendicular line to the point of tape contact at the support 33 (FIG. 2), and the mass density of the tape per unit area is $\rho$.

The air lubrication effects are modeled by using the Reynolds equation including the air compressibility and first order slip flow corrections (Burgdorfer). Assuming that air flow is only in the running direction of the tape this equation reduces to:

$$\frac{d}{dx}\left[ph^3\frac{dp}{dx}\left(1+6\frac{\lambda}{h}\right)\right] = 6\mu V\frac{d(ph)}{dx}, \quad (2)$$

where air pressure is p, head-to-tape spacing is h, air viscosity is $\mu$, and length of the molecular mean free path for air is $\lambda$.

In a numerical solution, the contact pressure can be applied to the tape's equilibrium equation in the following way (Kikuchi):

$$P_c = f(h)H(-(h-\sigma_T)), \quad (3)$$

where H is the Heaviside step function, and $\sigma_T$ is a threshold value for the separation of the contacting tape and head surfaces above which contact pressure is not applied. For f(h) the empirically determined asperity compliance function was used:

$$P_c = \frac{P_o}{\sigma_t^2}(h-\sigma_t)^2, \quad (4)$$

where $P_o$ is a constant obtained by extrapolating the experimentally determined, parabolic compliance curve to h=0 (Lacey (Measurement), Wu).

The head-to-tape spacing is calculated by adding the tape displacement to the mathematical description of the head shape $\delta(x)^{I_w}$:

$$h = W + \delta^{I_w}. \quad (5)$$

The head shape is subject to change due to wear. In this model and others (Lacey (Simulation), Patton) head wear is calculated incrementally, using Archard's wear relation, which is a high pressure approximation that claims wear is proportional to the product of sliding distance and pressure. In the above equation the superscript $I_w$ indicates the wear iteration number in the numerical model. Using Archard's wear relation, the increment of wear, $$\Delta\delta_w^{I_w},$$

per iteration is calculated by, $$\Delta\delta_w^{I_w} = k\frac{L}{H}P_c, \quad (6)$$

where, k is a wear coefficient usually determined by experiment, L is the length of tape sliding per increment, H is the hardness of the head material and $P_c$ is the apparent contact pressure as described above. The head shape after each wear iteration is calculated as:

$$\delta(x)^{I_w+1} = \delta(x)^{I_w} - \Delta\delta(x)^I.$$

In general, the wear coefficient is determined experimentally. Bhushan and Lowry reported that the wear rate of Altic against $CrO_2$ magnetic tape is 1.1 nm/km. Using the parameters reported in their paper the wear coefficient, k, is calculated from this value to be $190\times10^{-9}$ (H=18.2 GPa, and $P_c$ =105 kPa).

There is experimental evidence to indicate that $CrO_2$ tape is much more abrasive than the two tapes used in the examples discussed herein (Bhushan and Lowry, Patton). Therefore, the wear coefficient obtained by Bhushan and Lowry is a pessimistic upper limit.

Experimental evidence has been developed in connection with the present invention (in the wear of the wrapped Altic corner), that at sufficiently low pressure Archard's relation does not hold; i.e., the wear rate decreases more rapidly than in proportion to pressure. This suggests the existence of a material-dependent threshold-of-wear pressure.

The experiments conducted in connection with the present invention suggest that even at a contact pressure of a few atmospheres (~300 KPa), a threshold-of-no-wear in Altic has been reached with the tapes used. This upper limit on wear rate at 300 KPa is less than 0.4% of the 1.1 nm/km reported wear rate and is at three times the (modeled) contact pressure.

The Boundary Conditions

The strain free configuration of the tape is parallel to the flat surface of the head. The machine-normal displacements on the upstream and the downstream side supports are indicated by $U_L$ and $U_R$, respectively. For the one-sided wrap (FIG. 2) $U_R$=0. Sufficiently far from the wrapped corner, displacements asymptotically approach tangent lines joining the corner with distant tape supports The air pressure is considered ambient at the corners of the head. (This is an approximation that is not adequate for sufficiently high speeds, low tensions, and low wrap angles. Border conditions should be modified for 'outside' Navier-Stokes pressure. (Rogers)) These boundary conditions lead to the following equations:

$$\text{at } x = 0, w = -U_L, \frac{dw}{dx} = \left|\frac{U_L}{L_{tl}}\right| \quad (8)$$

at $x = L$, $w = -U_R$, $\dfrac{dw}{dx} = -\left|\dfrac{U_R}{L_{t2}}\right|$ at $x = x_{LE}$, $p = P_a$ at $x = x_{TE}$, $p = P_a$ The lengths $L_{t1}$ and $L_{t2}$ are indicated as 2.9 mm and 14 mm in FIG. 2, respectively.

The Solution Method

Equations [1–5], and [8] form a system of equations that model the equilibrium of tape, air bearing, and contact pressure at steady state. The numerical solution algorithm used for this nonlinear set of equations is given in Müftü and Benson, Modelling. Superimposed on these equations is the head wear equations described by equations [6] and [7]. Here an additional wear iteration loop is added outside the one that solves w, p, and $P_c$ simultaneously. The wear calculations are performed after a converged solution for w, p, and $P_c$ is found and the head shape is updated as described above.

NUMERICAL RESULTS

Evaluation of the Wear Model

Figure 9:
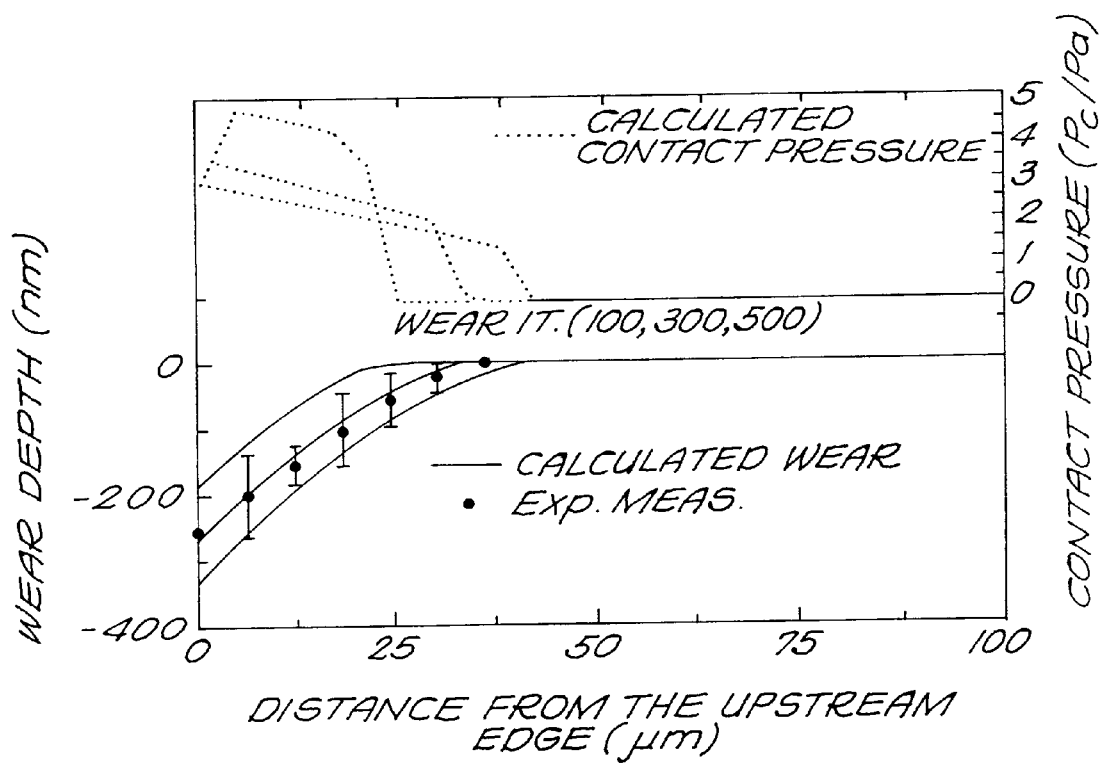
FIG. 9 compares graphically the experimentally measured and calculated wear profiles at the upstream edge, also showing the contact pressures.

The wrap geometry shown in FIG. 2 was modeled with a wear constant $$C = k\dfrac{L}{H} = 1 \times 10^{-15} m/\text{Pa}.$$

m/Pa. The other parameters used in the solution are given in Table 1. The results of the modeling program are compared on the upstream edge with the measured worn profile in FIG. 9. This figure shows that at 300 wear iterations, the theoretically modeled wear profile (solid lines) matches the experimentally measured one (plotted points with error bars) almost perfectly. This figure also shows the contact pressure distribution (dotted lines) predicted by the model.

TABLE 1

| E | 4 GPa | $\sigma_r$ | 48, 36 nm |
|---|---|---|---|
| v | 0.3 | $P_0$ | 9–10 MPa |
| $\rho_a$ | 1400 kgm$^{-3}$ | | |
| c | 15.2, 27 µm | | |
| $P_a$ | 101.3 kPa | $C_r$ (relax.) | 0.8–1 |
| $\lambda_a$ | 63.5 nm | $\Delta x$ | 4.176 µm |
| $\mu$ | 1.85 × 10$^{-5}$ Nsm$^{-2}$ | | |

Table 1: Parameters used in model.

The Self-Acting, Subambient Air Bearing

As is mentioned above the physical experiments showed that the head-to-tape spacing over the signal exchange site essentially stays on the asperity level of the tape surface over a wide range of speeds (Hinteregger and Müftü). This is contrary to the more familiar case of the prior art, showing increasing spacing with increasing tape speed when the head has a circular shape and the tape is not wrapped around a sharp corner (Gross). The model of the apparatus of the invention shows that a "self-acting, subambient air bearing" is responsible for the mutual speed independence of effective head-to-tape spacing over a wide range of speeds greater than 0.5 m/s. Use of subambient pressure is familiar to the hard disk drive applications in the "zero-pressure" sliders (White). The stability of some tape head shapes which cause diverging head-to-tape spacing have been reported by Brewen et al. In all three of these cases expansion of air due to a diverging channel causes subambient air pressure. However, the diverging channels in the apparati known to the prior art must be machined into hard surfaces. They do not arise due to the mechanical properties (primarily the finite stiffness) of the flexible medium.

Figure 10A:
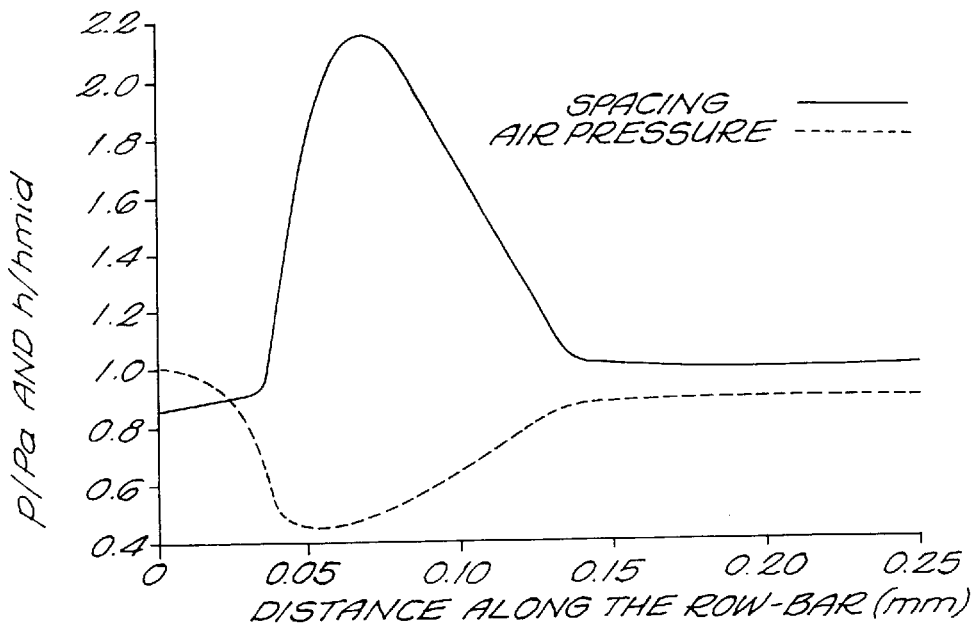
FIG. 10A shows graphically how the air pressure is affected by the head-tape spacing, calculated for 2.2° unidirectional wrap, 8 m/s tape speed and 86.96 N/m tape tension.
Figure 10B:
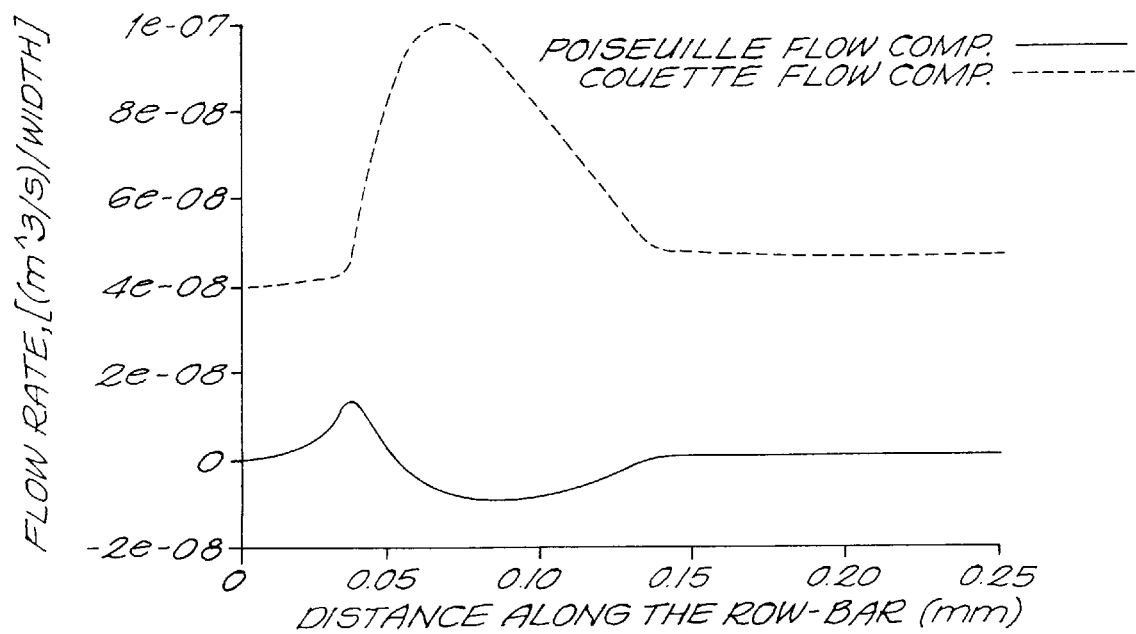
FIG. 10B shows graphically the air flow components, calculated as for FIG. 10A.

FIG. 10A shows the head-tape spacing and air pressure profiles at steady state near the upstream edge. (The horizontal scale for each of FIGS. 10A and 10B is the distance from the most upstream portion of the upstream corner. The vertical dimensions of FIG. 10A are: 1) non-dimensional pressure, compared to atmospheric; and 2) displacement, compared to hmid, the displacement midway along the head between the upstream and the downstream edges.) Here, it is seen that the air pressure is subambient. This subambient region spans the entire running length of the head from the upstream to the downstream corners. The contact pressure at the corners, which is not shown on this figure, balances the net or gage air pressure for equilibrium in the flat contact zone.

The subambient pressure that arises when the tape moves acts in three regions which have generally been discussed above. The "entry or corner contact region" is the worn, beveled area (slope 41 in FIG. 2A, corner curve 141 in FIG. 3A) at the upstream corner. In this region, air is entrained and the highest contact pressures between the tape and the head occur. Just beyond this entry or corner contact region, the tape takes the shape of a bump (42, 142) whose height and length depend on the bending stiffness (thickness and modulus) of the tape as well as tension, speed, and wrap angle. Under this bump lies the second, or "expansion-region," where the air pressure falls to subatmospheric values. No head-tape contact occurs in this region.

The third region, adjacent and downstream of the bump, is the "flat-contact" region where the head-to-tape spacing, and the contact and air pressures remain constant. This region constitutes most of the contact region along the machine dimension of the head, and here (because the tape is stationary in the out-of-plane dimension and because there are no other forces) the contact pressure equals the net subambient air pressure $P-P_A$.

FIG. 10B shows the Couette, $q_1 = V_x h/2$ (dotted line) and the Poiseuille, $$q_2 = -\dfrac{h^2}{12\mu}\dfrac{dp}{dx}(h + 6\lambda_a)$$

(solid line), components of the total air flow, $q = q_1 + q_2$, as well as schematic representations of the air velocity distributions in the interface. The vertical dimension of FIG. 10B is flow rate per unit width.

Consistently with spacing divergence in the corner contact region, $$\dfrac{dp}{dx}$$

is negative. Therefore, the Poiseuille component of the flow is positive in the 0–50 µm range. This causes air to be pulled through the corner contact region, expanding as it enters the bump zone. Maximum suction is produced where the Poiseuille flow component switches its sign. Further downstream Poiseuille flow becomes negative, indicating a resistance to flow, consistent with the converging shape of the downstream portion of the hollow. Here suction decreases toward a constant asymptotic value in the third flat contact region. For a given tape stiffness, tension and speed, for example, the wrap angle can be chosen to produce a contact pressure in this region which is a fraction of an atmosphere (~4–20%).

The Effect of Tape Speed and Tension on the Head-Tape Spacing

Figure 11A:
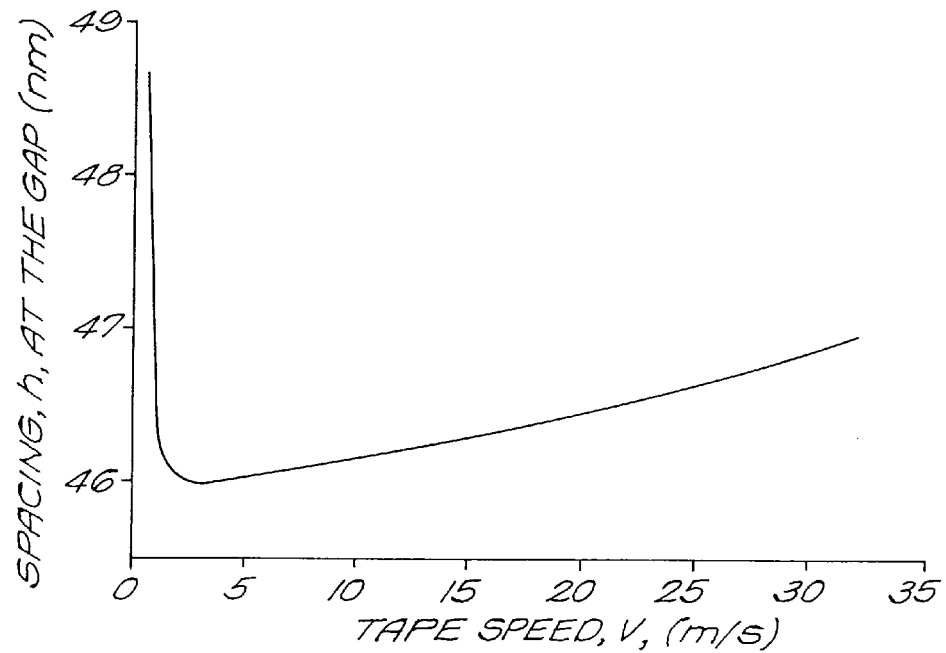
FIG. 11A shows graphically the effect of tape speed on spacing with respect to top of uncompressed 48 nm modeled asperity height for the unidirectional embodiment shown in FIG. 2.
Figure 11B:
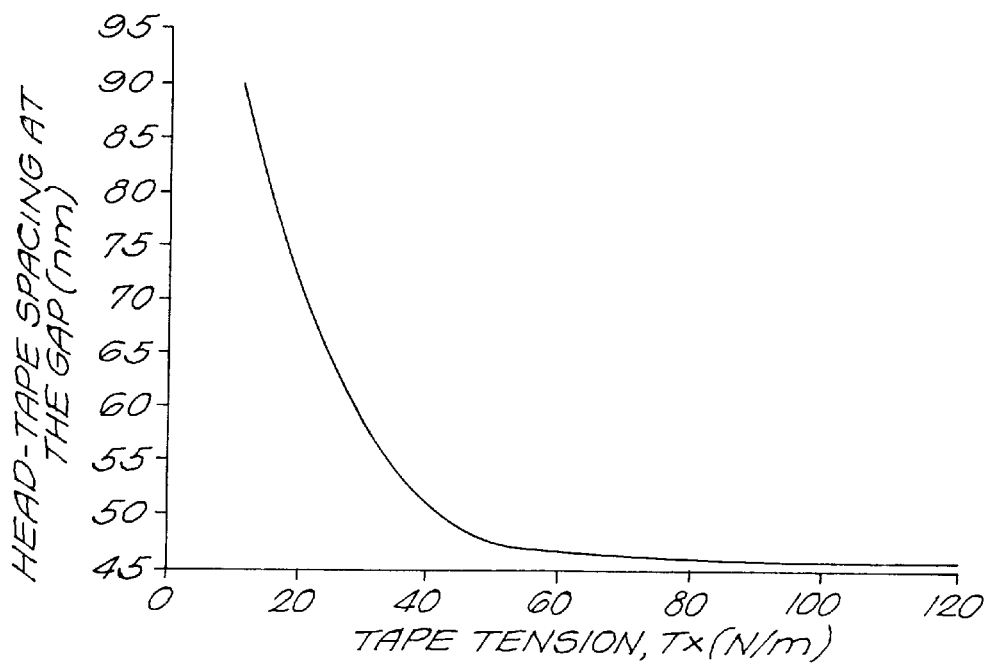
FIG. 11B shows graphically the effect of tension on the spacing for the unidirectional embodiment shown in FIG. 2.

The partial vacuum (suction) generated in the interface depends on the tape speed, tension, bending stiffness and wrap angle. The tape is considered to be in contact with the head if the spacing h between them is less than the assumed asperity height (48 nm). FIGS. 11A and 11B show that the tape would stay in contact with the head for a speed range of 1 to >40 m/s when the tape is wrapped 2.2° on the upstream edge under 87 N/m tension. This figure indicates that some separation, less than 1 nm of "flying", is predicted at the lowest tape speed modeled, 0.5 m/s. A minimum spacing of 46 nm is reached (a maximum of 2 nm of asperity compression occurs) at 2–8 m/s tape speed. Spacing increases very slightly at less than 1 nm to 35 m/s at higher speeds due to higher shear.

FIG. 11B shows the effects of varying the tape tension for the same geometry at 8 m/s. The tape contacts the head when tension is greater than ~45 N/m.

The Effect of Different Wrap Angles On Suction

Figure 12A:
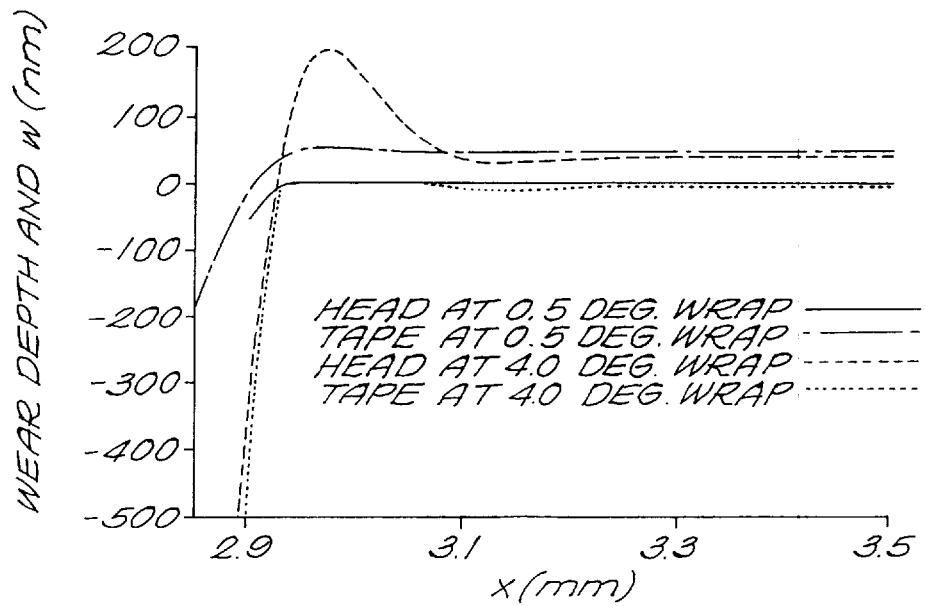
FIG. 12A shows graphically the tape displacement and the worn head contour near the upstream edge after 300 modeled wear iterations for two different wrap angles, calculated for unidirectional wrap, 8 m/s tape speed and 86.96 N/m tape tension.
Figure 12B:
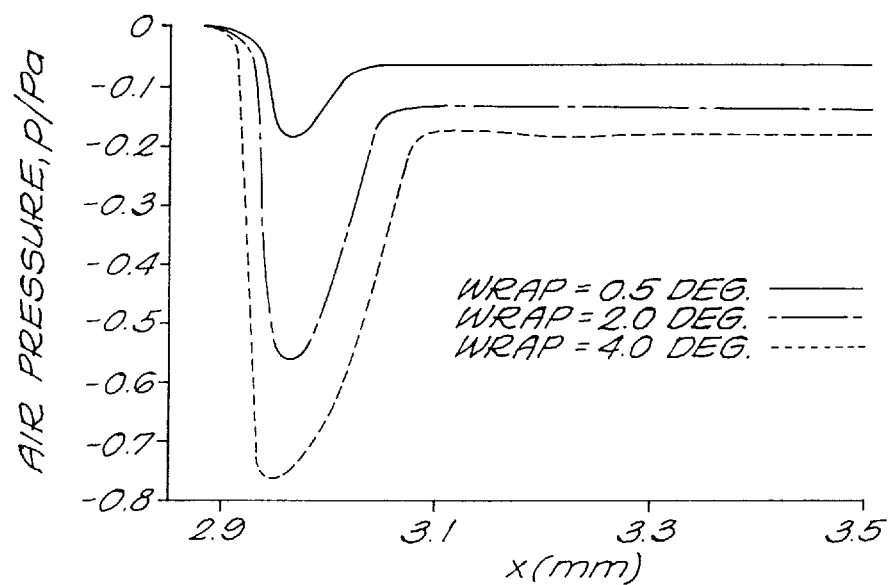
FIG. 12B shows graphically the suction generated due to expansion of air into the "expansion-region", calculated as for FIG. 12A.

In order to see the effect of different initial wrap angles on the interface, the wear for wrap angles between 0.5° and 4° was simulated in the model. The tape speed and tension were 8 m/s and 87 N/tn, respectively, and 300 121 m-long wear iterations were considered. The results are illustrated in FIGS. 12A and 12B. In FIG. 12A, the worn head shape and the tape displacement at the upstream edge are shown for 0.5° and 4°. The height of the bump (tape spacing from the head along out-of-plane dimension) in the expansion-region at 4° wrap is four times what it is at 0.5°. FIG. 12B shows the air pressure profiles for 0.5°, 2°, and 4° near the upstream edge. Higher wrap angles create higher absolute value normalized subambient pressures (more suction), due to having a bigger bump and thus "deeper" expansion-regions. For the wrap angles discussed here the maximum suction values occur for 4° wrap. The maximum and constant-spacing region suction values are given in Table 2. However, for tapes as thin as 6 $\mu$m, it has been estimated using the model discussed above that a wrap angle of 5.5° could be used. It is possible that for different tapes, higher wrap angles of a few more degrees, would also provide the advantages discussed herein.

TABLE 2

| Wrap Angle [°] | Wrap Angle [°] | Maximum Suction, p/P$_a$ | Const. Gap Suction, p/P$_a$ | Head to tape spacing, h [nm] |
|---|---|---|---|---|
| 0.5 | 0.08 | −0.18 | −0.06 | 46.79 |
| 1.0 | 0.15 | −0.34 | −0.09 | 46.52 |
| 2.0 | 0.32 | −0.56 | −0.14 | 46.21 |
| 3.0 | 0.49 | −0.70 | −0.17 | 46.00 |
| 4.0 | 0.67 | −0.76 | −0.18 | 45.94 |

Table 2: Approximate wear angle at upstream corner, peak and asymptotic vacuum pressure values as a function of the wrap angle.

The Effect of Different Wrap Angles On Wear

The Upstream Edge Wear

Figure 13A:
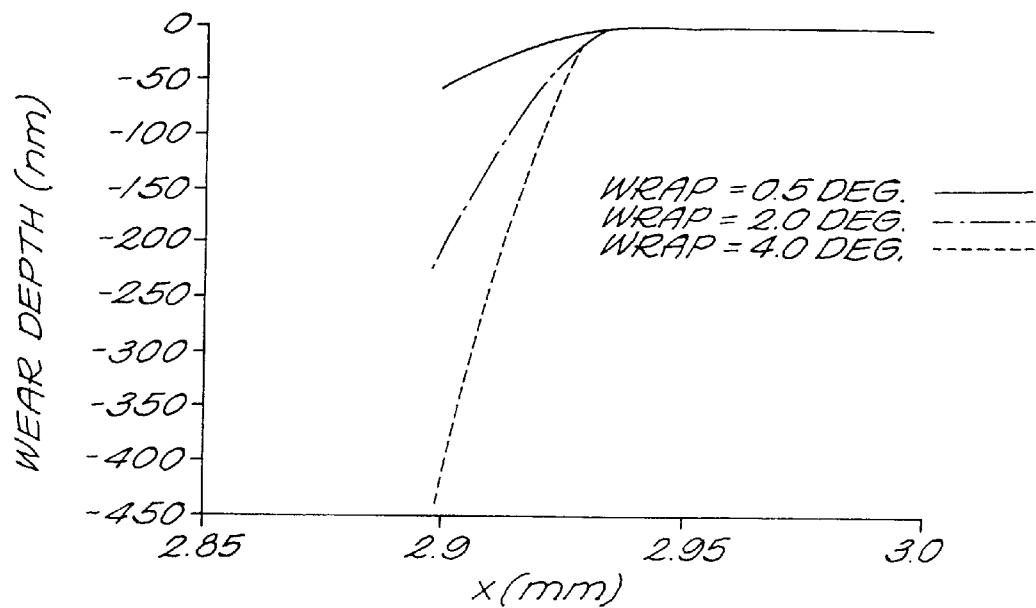
FIG. 13A shows graphically the upstream edge wear contour after 300 wear iterations, calculated as for FIG. 12A.
Figure 13B:
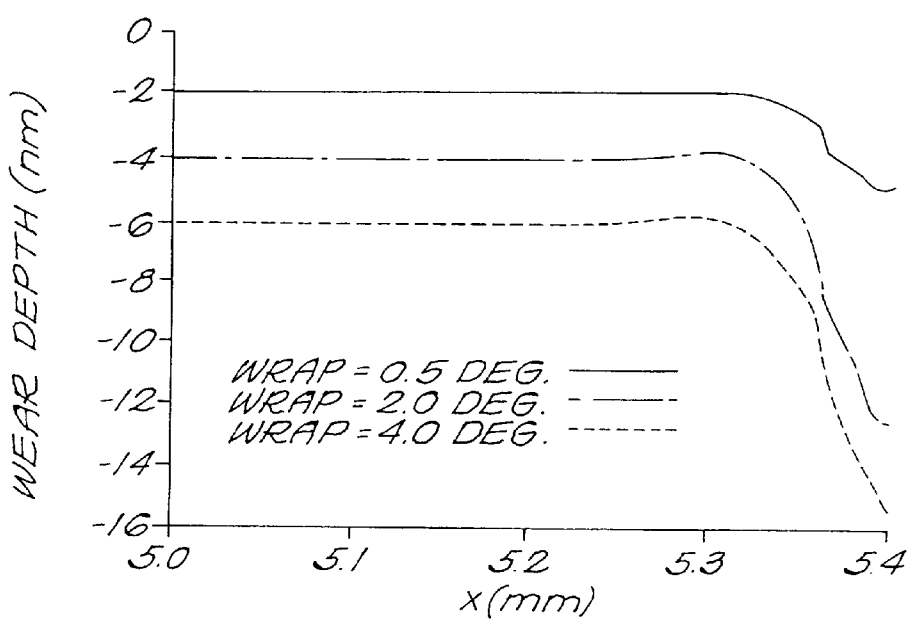
FIG. 13B shows graphically the downstream edge wear contour after 300 wear iterations, calculated as for FIG. 12A.

FIGS. 13A and 13B show the model predictions for upstream and downstream edge wear profiles for 0.5–4° wraps for 300 wear-iterations. On the upstream edge, the length of the wear profile along the machine dimension is 37 $\mu$m and it is nearly independent of the wrap angle. The shape of the wear profile closely follows the shape of the tape, which has an exponential form. An approximate "wear angle" was calculated for each one of the profiles by connecting the lowest and highest wear points along the out-of-plane dimension in the worn zone by a straight line. The "wear angles", presented in Table 2, are smaller than the wrap angle. The ratio of the initial wrap angle to the approximate wear angle of the bevel is ~6:1 for c=15.2 $\mu$m, and T=87 N/m, where c is tape thickness and T is tape tension.

Unwrapped Downstream Edge Wear

The thin-film head region on the downstream edge is softer than Altic and was not wrapped to prevent wear, for the unidirectional case. This region consists of a ~3 $\mu$m thick alumina layer sputtered on Altic, as undercoat, followed by a ~10 $\mu$m thick (in total) Permalloy layers, and a ~15 $\mu$m thick alumina layer, as overcoat. For Altic, using k=190× 10$^{-9}$ and H=23.5 GPa, each wear iteration corresponds to roughly 121 m of tape sliding against the head. Wear data for plasma sprayed alumina was used in place of sputtered alumina and Mn-Zn-Ferrite in place of Permalloy. Wear constants, C, were then calculated for 121 m of sliding as shown in Table 3. The wear coefficients used in the model may be off by more than an order of magnitude for some of the materials; Permalloy is less wear resistant than Mn-Zn-Ferrite. The hardness of sputtered alumina is 10 GPa.

The modeled wear at the end of 300 wear iterations at 8 m/s velocity and under 87 N/m tension, is shown in FIG. 13B. The model predicts much less wear at the unwrapped downstream corner than what was experimentally observed (shown in FIG. 8B). The discrepancy may be due not only to some unrealistic wear coefficients, but also to neglecting the Navier-Stokes pressure beyond the corner, which tends to wrap the tape slightly, thereby potentially causing some wear.

The Bidirectional Contact Flat Tare Head

Figure 4:
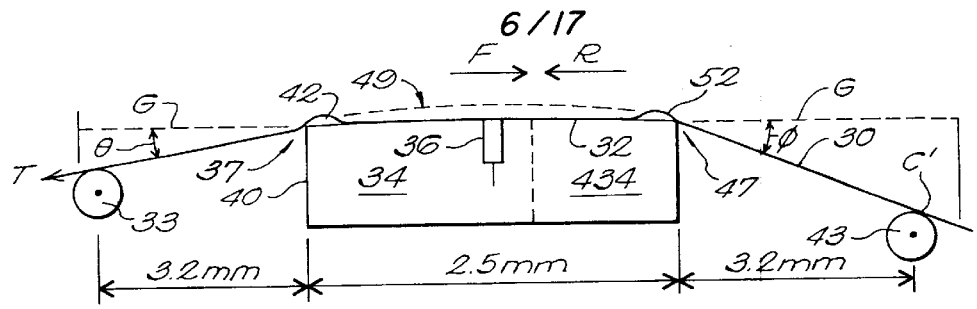
FIG. 4 is a schematic representation of a linear, bidirectional flat head embodiment of the invention.

Bidirectional contact with a flat surface can be obtained by wrapping the tape on both corners as shown in FIG. 4. The "soft" thin-film layers can be protected by a cover bar 434, as shown in FIG. 4, that can be glued onto an asymmetrically fabricated row-bar. (It is typically easier to fabricate a thin film head with the thin film element closer to one edge, which is why a cover bar is suggested. However, it could also be fabricated with the thin film region located in the middle of a monolithic head.) This bidirectional contact head was studied in numerically modeled wear tests similar to the unidirectional contact embodiment discussed above. The wrap angle was varied between 1–4° at 2 m/s and under T=87 N/m. The asperity engagement height was $\sigma_r$=36 nm instead of 48 nm in the unidirectional model tests. Both are reasonable. In order to properly simulate the bidirectionality of the head the tape speed was switched between −2 and 2 m/s at each iteration.

Figure 14A:
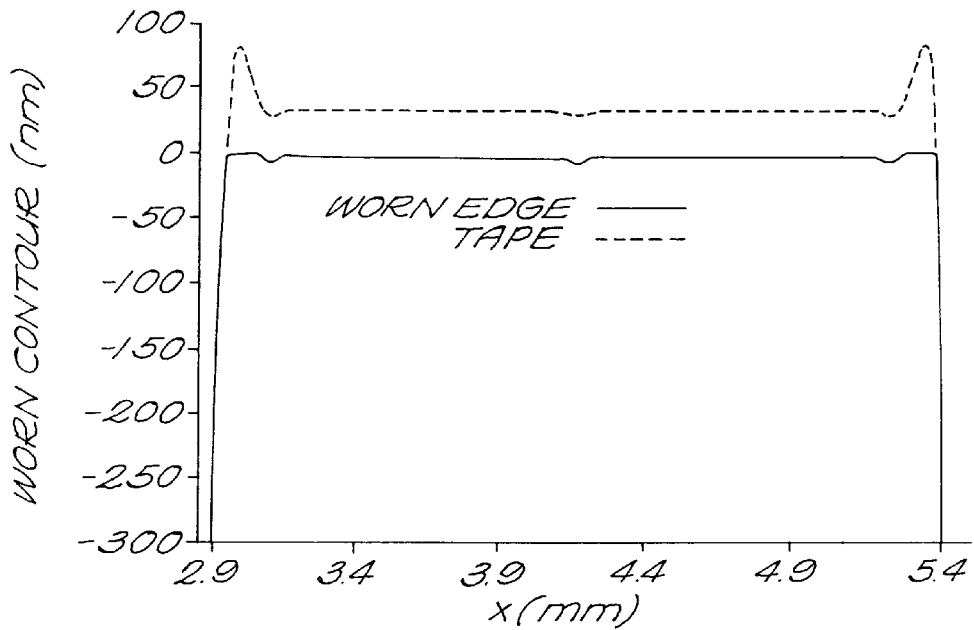
FIG. 14A shows graphically the tape displacement and worn head contour after 300 modeled wear iterations for the bidirectional flat head, calculated for 2° wrap angle, 2 m/s tape speed and 86.96 N/m tape tension.
Figure 14B:
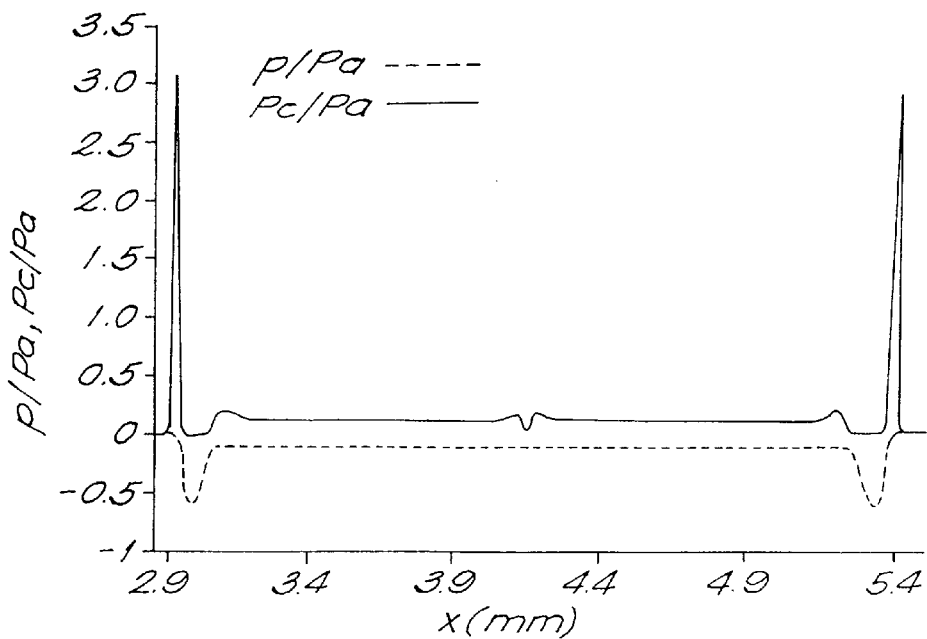
FIG. 14B shows graphically the air and contact pressures after 300 wear iterations for the bidirectional flat head, calculated as for FIG. 14A.

The results of 2° wrap after 300 wear iterations are given in FIGS. 14A and 14B. In FIG. 14A, two bumps or "expansion-regions" occur near the two corners of the head. The suction effect is similar to the unidirectional embodiment. However, near the downstream corner of the interface (for whatever direction the tape is moving) the flat contact region expands into the downstream bump. See the non-dimensionalized air pressure profile p/P$_a$ in FIG. 14B. The contact pressure is nearly uniform in the middle section of the head and it balances the air suction. On the edges, there are the usual high pressure contact spikes from wrapped corner contact, which balance the sum of subambient air pressure in the corner contact region, and the wrap pressure.

The numerical modeling experiments show that wear of the two corners of the bidirectional contact head is identical to wear at the upstream corner of the unidirectional contact embodiment. This result is to be expected.

The Influence of Wrap Angle on Pole-Tip Wear

The magnetic read element height or throat height of an inductive thin film head is approximately 2 $\mu$m. These heads therefore tolerate less than 1 M-m of wear. Moreover, pole-tip and shield recession can cause additional spacing and its associated signal loss. Therefore, the prediction of the wear amounts at the pole-tip region is crucial. The long term effect of wear on head wear and pole-tip recession was simulated using the data given in Table 3.

TABLE 3

| Material | H [GPa] | k (×10$^{-9}$) | C (×10$^{-15}$) [m/Pa] |
|---|---|---|---|
| Al$_2$O$_3$-TiC | 23.0 | 190[1] | 1.0 |
| Pl. Sprayed Al$_2$O$_3$ | 20.0[3] | 558[2] | 3.3 |
| Mn—Zn-Ferrite | 6.2 | 335[2] | 6.6 |

1 For: CrO$_2$. Tape, Contact Pressure: 105 kPa. Sliding Dist: 1 km. (Bhushan and Lowry)
2 For magnetic tape w/γ-Fe$_2$O$_3$. Contact Pressure: 25.2 kPa. Sliding Dist: 293 km, (Bhushan, Tribology, p. 446)
3 (Bhushan, Tribology, p. 800)
Table 3: The wear constants used for the gap wear calculations (L = 121 m).

Figure 15A:
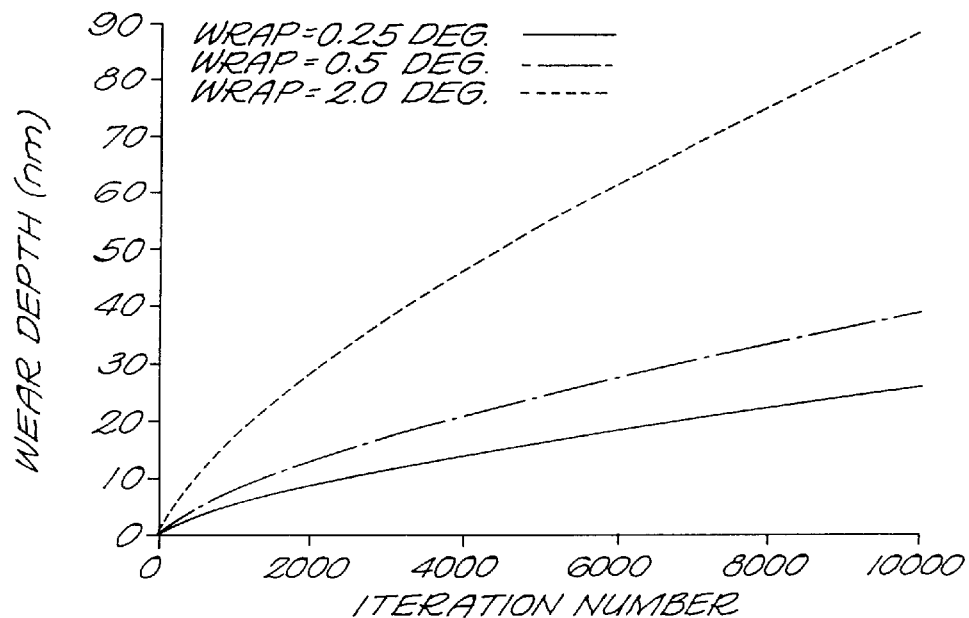
FIG. 15A shows graphically the modeled signal exchange site gap wear vs. number of wear iterations (each iteration corresponding to 121 m of tape running over the head) for the bidirectional head, calculated for 2 m/s tape speed, 86.96 N/s tape tension and various wrap angles.

The head wear for 10,000 iterations is plotted for three different bidirectional wrap angles in FIG. 15A. This figure shows that wear-vs.-sliding distance (wear iterations) curve is initially non-linear however as a wear equilibrium is reached the curve becomes linear. Based on these curves it can be said that 1 $\mu$m wear will be reached in 8235 hours for 0.25° wrap, 6113 hours for 0.5° wrap and 2344 hours for 2° wrap.

Figure 15B:
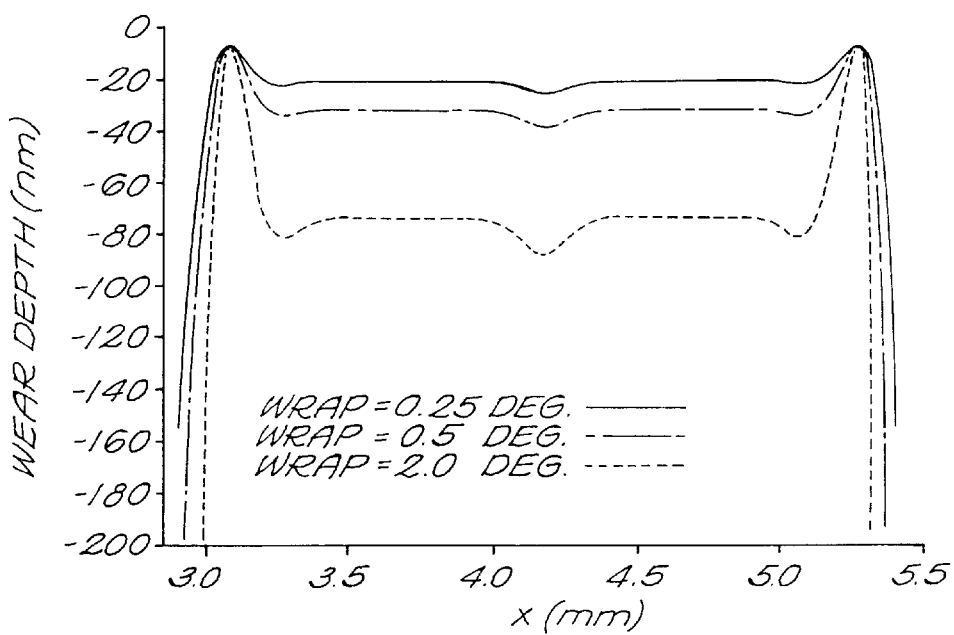
FIG. 15B shows graphically the modeled wear depth along a line on the head surface for three different wrap angles (specified in FIG. 15A) at the end of the 10,000th iteration.

FIG. 15B shows the recession of the pole tip region at the end of 10,000 wear iterations. The shallowest wrap angle 0.5° produces the lowest pole-tip recession ~5 nm, whereas the 2° wrap produces ~15 nm of pole-tip recession. As the wear progresses linearly, as shown in FIG. 15A it is expected that the pole tip-recession would stay constant.

The Threshold of Wear

The experimental work indicates that head wear predictions given above are overestimated. In approximately 58,000 km of running in contact, during the experiment, no evidence of wear on Altic in the constant gap region (near the signal exchange site) was observable. More than several nanometers of wear would have resulted in change of the MR head resistance. Therefore, this suggests that wear of Altic is negligible at the contact pressures that were applied (~14 kPa) in the constant-spacing region. Further, only 300 wear iterations (~36 km of simulation) were sufficient to predict the experimentally observed wear on the upstream edge. Looking at the contact pressure levels for this case from FIG. 9 it is seen that the highest contact pressure is ~350 kPa. This suggests that the wear may stop even at higher contact pressures. More controlled experiments are necessary to obtain the wear behaviour at low contact pressures.

SUMMARY AND CONCLUSIONS

The mechanics of a moving flexible tape when it is wrapped over a sharp corner on a flat or curved surface with small wrap angles (0.25°–5.5°) has been analyzed. A stable, self-acting subambient air bearing forms between the tape and the surface. The air, a partial vacuum (suction) pulls the tape into contact with the head. A low (0.04 to 0.2 atm.) vacuum pressure can be maintained in the flat contact region of the head. The wrapped corners initially have most of the wear due to high corner contact pressure. The worn bevel angle is less than one-half the wrap angle due to suction. The wear angle to wrap angle ratio is approximately 1/6 for the conditions studied. (The horizontal scale for each of FIGS. 10A and 10B is the distance from the upstream corner. The vertical dimension of FIG. 10A is pressure, compared to atmospheric and displacement, compared to hmid, the displacement midway along the head between the upstream and the downstream corners). The model agrees well with the wear of wrapped corners measured with a stylus profilometer.

The model also predicts that suction increases with increasing wrap angle, faster tape speed (to about two m/s, but decreases very slowly above about eight m/s) and higher tape tension. The bidirectional contact version of the flat-head works with the same principle. It was shown that a low wrap angle is desirable for reducing the head wear and the pole tip recession especially if relatively soft signal exchange elements are located in the corner contact region.

The experimental results suggest there is a contact pressure below which wear stops. This threshold value appears to be about 350 kPa's for Altic, with the tapes used.

The model also predicts that for Tension=87 N/m and Velocity of tape=2 m/s, the upper limits of the wrap angle are 5.5°, 4° and 3.5° for tape thicknesses of 6$\mu$m, 15.2 $\mu$m and 27 $\mu$m respectively. The lower limit of the wrap angle is on the order of 0.25°. Thus, it can be seen that without the understanding provided by the model, it is very difficult to determine the limits of the wrap angle for which the benefits of the invention will arise. In fact, in an experimental situation, without very special equipment, it is difficult to know what the wrap angle actually is, within a level of precision greater than about 1°. Therefore, an appreciation of the model is very important for understanding the invention, and its limits.

From a design standpoint, the model analysis and experimental results suggest that it is desirable to machine into the upstream corner a bevel angle, on the order of what would be the natural wear angle. The angle should be small, but relatively long, along the machine dimension, as the contact pressure drops as the length of the bevel increases. The length should be long enough so that the pressure drops below that below which no wear is experienced. Further, the overwrap angle θ should be chosen at the minimum for which reliable contact can be maintained. Typically, the wear bevel angle and the overwrap angle are at a ratio on the order of 1:6. Thus, the wear angle may be on the order of 0.04°.

The foregoing discussion has assumed that the media being transported is a magnetic tape or (floppy disk). However, the invention is useful for any flexible sheet media that is moved over a support structure, where it is desirable to maintain the sheet in reliable low pressure contact with a flat surface.

Other media candidates for the invention include paper, such as used in photocopying machines, where electrostatic charges are applied to paper, or where paper is printed upon by ink jets, or in photographic processes. The corner contact region can also be exploited to remove asperities from the media. The wrap angle and length of bevel can both be varied over a wide range so that corner contact pressures below threshold-of-wear for much softer materials than Altic should be obtainable, allowing heads, for example to be placed at corners in such a way as to both guarantee bidirectional contact and no head wear.

The apparatus of the invention has been described above with particular attention to the head and the media support. However, the invention also includes an entire media reading and recording device, with the novel head and media support arrangement of the invention, coupled with known or later to be developed signal processing circuitry, tape drive actuators (motors, etc.) and tape storage apparatus, such as reels.

The invention has been described above as an apparatus. Another embodiment of the invention is a method of reading and writing signals to a flexible magnetic media, as discussed in connection with the apparatus. The method entails providing a media transport mechanism as discussed above, (linear tape, rotating disk, helical wrap tape) which achieves a hollow bump in the media on the upstream edge of a unitary signal exchange head. The head and media approach angle are chosen such that a minimal amount of air is entrained, in any case, less than that which would cause the media to fly around the head. The head upstream corner is sufficiently sharp relative to the signal exchange surface, so that the media cannot mold perfectly around the corner, rather forming a hollow bump. The tape is caused to move such that entrained air is expanded into the hollow of the bump, causing a negative pressure relative to atmospheric, which draws the tape toward and into contact with the signal exchange surface. This contact is maintained until further downstream than the signal exchange site, thereby insuring good signal exchange.

With this method the tape can be operated at high speeds. The angle can be adjusted so that minimal wear is experienced, as discussed.

With all of the embodiments of the invention (tape, disk, helical drive, magnetic media, paper media) the designer will appreciate that the model of the invention teaches how to identify, with routine experimentation a minimum wrap angle that will insure reliable contact between the media and the signal exchange head. The size of the wrap angle may not be within the range of 0.25 to 5°, depending on the parameters of the media, discussed above. Further, the model of the invention and routine experimentation will allow the designer to identify the maximum wrap angle, above which wear of the head will arise, which may also be outside of the range mentioned above. The designer can also identify the minimum wrap angle for which good contact can be assured. It is a goal of a preferred embodiment of the invention to use a wrap angle that falls within these limits, or as near thereto as practical, to achieve minimal wear with good signal transfer.

The foregoing discussion should be understood as illustrative and should not be considered to be limiting in any sense. While this invention has been particularly shown and described with references to preferred embodiments thereof, it will be understood by those skilled in the art that various changes in form and details may be made therein without departing from the spirit and scope of the invention as defined by the claims.

The corresponding structures, materials, acts and equivalents of all means or step plus function elements in the claims below are intended to include any structure, material, or acts for performing the functions in combination with other claimed elements as specifically claimed.

Having described the invention, what is claimed is:

1. A helical scan head assembly for use with magnetic tape that is wrapped helically around a rotating drum of said head assembly, and moves, relative to a stationary reference in the same direction that said drum is rotating, but at a slower speed, so that, from the perspective of the rotating drum, the tape is observed to be moving along a circumferential machine dimension from an upstream direction to a downstream direction, said head assembly comprising:

a. a first circular cylindrical drum that is rotatable around an axis;
   b. fixed to said rotatable drum, a head, having a signal exchange surface that comprises:
      i. a signal exchange site;
      ii. an upstream corner upstream of said signal exchange site; and
      iii an upstream signal exchange surface, defined by an upstream main signal exchange surface curve, located along said machine dimension between said upstream corner and said signal exchange site, which signal exchange surface meets said upstream corner at a main slope discontinuity and has an upstream main tangent $\tau_{main}$ at said main slope discontinuity; and
   said head being located at a radial position and said upstream corner being sufficiently sharp and said upstream main tangent being such that, if any said tape is wrapped helically around said drum and contacts said head and said drum is rotating relative to said tape, then;
      i. an upstream portion of said tape contacts said upstream corner;
      ii. a portion of said tape that is downstream and adjacent to said upstream corner contacting portion, is spaced away from said signal exchange surface adjacent to and downstream from said main slope discontinuity, forming a hollow bump between said tape and said signal exchange surface; and
      iii. a portion of said tape downstream from and adjacent said hollow bump contacts said signal exchange surface along the full extent from said bump to and including said signal exchange site.

2. The head assembly of claim 1, said signal exchange surface comprising a flat surface that is inclined at a non-zero angle φ relative to a tangent to the circumference of said drum along a radius that passes through said surface.

3. The head assembly of claim 1, said signal exchange surface comprising a flat surface that is substantially parallel to a tangent to the circumference of said drum along a radius that passes through said surface.

4. The head assembly of claim 1, said signal exchange surface comprising a non-flat, curved surface.

5. The head assembly of claim 1, further comprising a drive for rotating said drum and a transport for moving said tape.

6. The head assembly of claim 1, further comprising signal amplification and processing circuitry.

7. The head assembly of claim 1 said upstream corner comprising a corner surface that meets said main upstream signal exchange surface at said main slope discontinuity, said corner surface having a main corner tangent $\tau_{corner}$, at said main slope discontinuity and having a side corner tangent $\tau_{side}$, at a side slope discontinuity that is spaced upstream from said main slope discontinuity.

8. The head assembly of claim 7, said first head support being located such that a wrap angle θ from said upstream main tangent $\tau_{main}$ to a point along said tape path upstream of said upstream corner and downstream of any portion of said tape that contacts the circumference of said drum is overwrapped past an angle α between said upstream main tangent $\tau_{main}$ and said side corner tangent $\tau_{side}$.

9. The head assembly of claim 7 said head being located radially of said drum such that a wrap angle θ from said upstream main tangent $\tau_{main}$ to a point along said media path upstream of said upstream corner and downstream of any portion of said tape that contacts the circumference of said drum is between 0.25 and 5.5°.

10. A helical scan head assembly for use with magnetic tape that is wrapped helically around a rotating drum of said head assembly, and moves, relative to a stationary reference in the same direction that said drum is rotating, but at a slower speed, so that, from the perspective of the rotating drum, the tape is observed to be moving along a circumferential machine dimension from an upstream direction to a downstream direction, said head assembly comprising:

a. a first circular cylindrical drum that is rotatable around an axis;
 b. fixed to said rotatable drum, a head, having a signal exchange surface that comprises:
  i. a signal exchange site;
  ii. an upstream corner upstream of said signal exchange site; and
  iii an upstream signal exchange surface, defined by an upstream main signal exchange surface curve, located along said machine dimension between said upstream corner and said signal exchange site, which signal exchange surface meets said upstream corner at a main slope discontinuity and has an upstream main tangent $\tau_{main}$ at said main slope discontinuity; and
 c. said head being located at a radial position and said upstream corner comprising a corner surface that meets said main upstream signal exchange surface at said main slope discontinuity, said corner surface having a main corner tangent $\tau_{corner}$, at said main slope discontinuity and having a side corner tangent $\tau_{side}$, at a side slope discontinuity that is spaced upstream from said main slope discontinuity such that, if any said tape is wrapped helically around said drum and contacts said head and said drum is rotating relative to said tape, then a wrap angle θ from said upstream main tangent $\tau_{main}$ to a point along said media path upstream of said upstream corner and downstream of any portion of said tape that contacts the circumference of said drum is between 0.25 and 5.5°.

* * * * *